United States Patent [19]

Ishimaru

[11] 4,445,401

[45] May 1, 1984

[54] GEAR SHIFT SHOCK REDUCING APPARATUS FOR HYDRAULIC CONTROL SYSTEM OF AUTOMATIC TRANSMISSION

[76] Inventor: Wataru Ishimaru, No. 3-5-19, Ikego, Zushi City, Japan

[21] Appl. No.: 195,738

[22] Filed: Oct. 10, 1980

[30] Foreign Application Priority Data

Oct. 15, 1979 [JP] Japan .................................. 54-131739

[51] Int. Cl.³ ...................... B60K 41/06; B60K 41/10
[52] U.S. Cl. ....................................... 74/869; 74/867; 74/868
[58] Field of Search ................. 74/867, 868, 869, 870, 74/878

[56] References Cited

U.S. PATENT DOCUMENTS

| | | | |
|---|---|---|---|
| 3,563,115 | 2/1971 | Iijima et al. | 74/869 |
| 3,583,259 | 6/1971 | Shimosaki | 74/869 X |
| 3,710,630 | 1/1973 | Sumiyoshi et al. | 74/867 X |
| 3,752,015 | 8/1973 | Murakami | 74/869 |
| 3,800,628 | 4/1974 | Piret | 74/864 |
| 3,832,915 | 9/1974 | Hiramatsu | 74/869 |
| 3,855,880 | 12/1974 | Ishimaru et al. | 74/869 |
| 3,999,450 | 12/1976 | Miyauchi et al. | 74/869 X |
| 4,136,584 | 1/1979 | Ishikawa | 74/867 |
| 4,265,346 | 5/1981 | Emmadi | 74/867 X |
| 4,324,154 | 4/1982 | Iwanaga et al. | 74/869 |
| 4,324,156 | 4/1982 | Iwanaga et al. | 74/869 |
| 4,325,271 | 4/1982 | Iwanaga et al. | 74/878 X |

FOREIGN PATENT DOCUMENTS

| | | |
|---|---|---|
| 1817634 | 8/1969 | Fed. Rep. of Germany . |
| 2232802 | 4/1973 | Fed. Rep. of Germany . |
| 2248524 | 4/1973 | Fed. Rep. of Germany . |
| 1208193 | 10/1970 | United Kingdom . |
| 1232131 | 5/1971 | United Kingdom . |
| 1398748 | 6/1975 | United Kingdom . |
| 1427686 | 3/1976 | United Kingdom . |
| 1450816 | 9/1976 | United Kingdom . |
| 1482762 | 8/1977 | United Kingdom . |
| 1489353 | 10/1977 | United Kingdom . |
| 2031533 | 4/1980 | United Kingdom . |

Primary Examiner—Rodney H. Bonck

[57] ABSTRACT

A gear shift shock reducing apparatus for a hydraulic control system of an automotive automatic transmission comprising a pressure reducing valve operatively disposed between an actuating means of a frictional unit and a manual selector valve to produce a pressure which is not higher than a line pressure. The pressure reducing valve is responsive to a kickdown condition and is rendered inoperative.

8 Claims, 9 Drawing Figures

GEAR SHIFT SHOCK REDUCING APPARATUS FOR HYDRAULIC CONTROL SYSTEM OF AUTOMATIC TRANSMISSION

BACKGROUND OF THE INVENTION

1. Field of the Invention

The present invention relates to a gear shift shock reducing apparatus for a hydraulic control system of an automatic transmission.

2. Description of the Prior Art

In automatic transmissions, a shift is made automatically between gears either by supplying a fluid pressure, for example, a line pressure, to a corresponding friction unit or by discharging the fluid pressure from the same as a result of an upshift or downshift operation of a gear shift valve. During a gear shifting operation, the driver feels a shock (often called as a "gear shift shock") because the gear ratio (a gear reduction ratio) to be used changes, thus changing the output torque of the transmission.

The amount of the gear shift shock is determined by the amount of the torque capacity of a friction element in relation to the amount of torque required to the friction element in accordance with the driving torque of an engine, and if the amount of the required torque to the friction element is greater than the amount of torque capacity thereof, the amount of the gear shift shock increases, while, if the required amount of torque is smaller than the amount of torque capacity, the coupling force of the friction element is insufficient, allowing the friction element to slip, thus not only preventing the transmission of the driving power without any loss, but also causing a serious and a damaging overheating of the friction element. Accordingly, it is known to design each friction element such that the torque capacity thereof is slightly larger than necessary in order to avoid these problems.

Since the automatic transmission can not avoid the above-mentioned shock, it has been the conventional practice to use an accumulator a as shown in FIG. 1 to cope with this problem. Referring to the accumulator a, if a shift valve is actuated to start feeding a line pressure $P_L$ through an orifice c to a friction element d, the operating oil pressure for said friction element $P_A$ is fed to a chamber e. The accumulator a is fed with the line pressure $P_L$ within a chamber f, wherein an accumulator piston g receives a downward force by the oil pressure $P_A$ within the chamber e (pressure receiving area A) and an upward force by the oil pressure $P_L$ within the chamber f (pressure receiving area B). The piston g further receives an upward force by a spring h, thus a equilibrium equation of the forces acting upon the piston g is expressed by the following equation if a spring force by the spring h is represented by $F_s$.

$$P_A \times A = P_L \times B + F_s$$

$$P_A = (B/A)P_L + (Fs/A) \tag{1}$$

Explaining now a change in the oil pressure $P_A$ vs. time (a change in the torque capacity of the friction element d), as is apparently shown together with a change in an output axle torque of a transmission vs. time in FIG. 2, when the line pressure is fed to the friction element d after the shift valve b is actuated, the oil pressure $P_A$ increases to $P'_A$ during a period beginning at the initiation of coupling and ending at the initiation of the subsequent gear change because of a sliding resistance in the friction element. Subsequently, when the gear change begins to take place as a result of the coupling of the friction element, the oil pressure $P''_A$ increases up to $P_A''$ because of the occurrence of a reaction at this time. The oil pressure $P_A$ begins to move the piston g downwardly against the pressure within the chamber f and the spring force Fs of the spring h. The oil pressure value $P''_A$ is expressed using said equation (1) as follows:

$$P'_A = (B/A)P_L + (Fs/A) \tag{2}$$

Since A>B and the spring force Fs is small, the oil pressure $P''_A$ takes a value that is a reduced value from the line pressure $P_L$ by a constant rate and since this reduced pressure is fed to the friction element d, the torque capacity of the friction element is initially suppressed small. During the downward movement of the piston g wherein the torque capacity of the friction element d is suppressed small, said friction element completes its coupling action and thereafter the piston g reaches its lower limit position. When the piston g has reached the low limit position, the accumulator stops effecting said pressure reducing function, thus allowing the oil pressure $P_A$ to increase to the same value as that of the line pressure $P_L$.

In the above-mentioned manner, the accumulator a regulates the actuating oil pressure $P_A$ to provide a torque capacity which varies in agreement with the required torque of the friction element d that is shown by the one dot chain line in FIG. 2 although slightly larger than the latter, thus decreasing a gear shift shock without causing the occurrence of a slip of the friction element.

However, the accumulator a is relatively bulky, which measures, in diameter, 30~35 mm and, in length, 60~65 mm, as compared to the shift valve b which measures, in diameter, about 10~15 mm, thus making it difficult to arrange the accumulator within a limited space provided by an automatic transmission, thus causing a bulky size of a hydraulic control portion of the automatic transmission. Besides, where the accumulator a is to be used, when a release of the friction element d is necessary in response to an inoperative position (a downshifted position) of the shift valve b, this release must be effected quickly. Thus, in order to disable the function of the orifice c upon release of the friction element d, a one-way valve as shown b i in FIG. 1 has been necessiated which prevents a flow of oil from the shift valve b toward the friction element d, thus causing a complicated and expensive structure of the automatic transmission as a result of an increase in the number of component parts.

Further, the accumulator a performs the before-mentioned pressure reducing function even under a kickdown condition (a condition when an accelerator pedal is fully depressed) in the same manner as its function under normal conditions, thus providing inconveniences which will be hereinafter explained. FIG. 3 shows a typical example of a shift pattern of an automatic transmission, and as will be apparently understood from this figure, shift points under a kickdown condition are shifted toward a higher vehicle speed side as compared to the corresponding shift points under normal conditions. It is to be noted that because the engine speed is high, the required torque capacity to the friction element should be high upon making a shift at high vehicle speeds as compared to the required capacity upon making a shift under low vehicle speeds even if a driving torque is the same, so that unless the torque capacity is large enough for the required torque capacity, a slippage time period of the friction element prolongs, causing an excessive wear of the friction element during a running condition wherein a kickdown occurs frequently, resulting in a braking. However, the above-mentioned accumulator performs the pressure reducing function not only under normal condition but also under a kickdown condition in the same manner, thus running short of a torque capacity of the friction element under the kickdown condition, thus failing to meet the demanded torque capacity as mentioned above.

SUMMARY OF THE INVENTION

The present invention resides in a gear shift shock reducing apparatus for a hydraulic control system of an automatic transmission which has been developed to realize a conception that the above-mentioned problems can be solved at once for all if, instead of, the above-mentioned accumulator, a pressure reducing valve is employed which is constructed and arranged as to perform a pressure reducing function under normal condition except a kickdown condition in a similar manner to the above-mentioned accumulator, but stops effecting its pressure reducing function under the kickdown condition.

DETAILED DESCRIPTION OF THE INVENTION

Hereinafter, the present invention will be explained in connection with an illustrated embodiment.

POWER TRAIN IN FIG. 4

Figure 4:
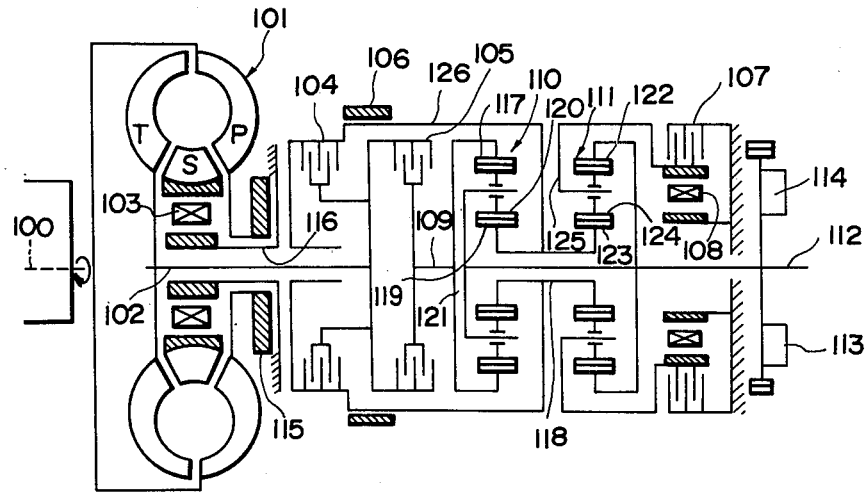
FIG. 4 is a schematic view of a power train of the automatic transmission.

FIG. 4 shows the construction of a power train of a three-forward speed and one-reverse speed automatic transmission comprising a crank shaft 100 to be driven by an engine, a torque converter 101, an input shaft 102, a front clutch 104, a rear clutch 105, a second brake 106, a low-and-reverse brake 107, a one-way clucth 108, an intermediate shaft 109, a first planetary gear assembly 110, a second planetary gear assembly 111, an output shaft 112, a first governor valve 113, a second governor valve 114, and an oil pump 115. The torque converter 101 comprises a pump impeller P, a turbine runner T, and a stator S, of which the pump impeller P is driven by the crank shaft 100 so that the torque converter working oil contained therein is caused to swirl and imparts torque to the turbine runner T which is secured to the input shaft 102. The torque is further transmitted through the input shaft 102 to the change-speed gearing arrangement. The startor S is mounted about a sleeve 116 with the one-way clutch 103 interposed therebetween. The one-way clutch 103 is constructed and arranged in such a manner as to permit a rotation of the stator S in the same direction as the direction of rotation of the crank shaft 100, viz., the direction indicated by the arrow (abbreviated hereinafter as forward rotation) and to prevent the opposite rotation of the stator S (abbreviated hereinafter as opposite direction). The first planetary gear assembly 110 comprises an internally toothed gear 117 rotatable with an intermediate shaft 109, a sun gear 119 rotatable with a hollow transmission shaft 118, not less than two planet pinions 120, each meshing with the internally toothed gear 117 and the sun gear 119 so that it rotates and moves along an orbit, and a front planet carrier 121 rotatable with the output shaft 112 and having the planet pinions 120 thereon, while the second planetary gear assembly 111 comprises an internally toothed gear 122 rotatable with the output shaft 112, a sun gear 123 rotatable with the hollow transmission shaft 118, not less than two planet pinions 124, each meshing with the internally toothed gear 122 and the sun gear 123 so that it rotates and moves along an orbit, and a rear planet carrier 125 having the planet pinions 124 thereon. The front clutch 104 is operative to connect the transmission input shaft 102 to be driven by the turbine runner T to the hollow transmission shaft 118 rotatable in unison with the both sun gears 119 and 123 through a drum 126, while, the rear clutch 105 is operative to connect the input shaft 102 to the internally toothed gear 117 of the first planetary gear assembly 110 through the intermediate shaft 109. The second brake 106 is operative to tighten a band winding the drum 126 secured to the hollow transmission shaft 118 so as to fix the both sun gears 119 and 123, while, the low-and-reverse brake 107 is operative to fix the rear planet carrier 125 of the second planetary gear assembly 111. The one-way clutch 108 is so constructed and arranged as to permit the forward rotation of the rear planet carrier 125 but prevent the opposite rotation thereof. The first governor valve 113 and second valve 114 are fixed to the output shaft 112 and are operative to produce a governor pressure corresponding to the vehicle speed. Description will be hereinafter made of the power transmission paths which are established when the selector lever is in the D (the forward automatic drive) position.

Under this condition, the rear clutch 105 serving as the forward input clutch is engaged. The power from the engine and having past through the torque converter 101 is transmitted, through the input shaft 102 and rear clutch 105, to the internally toothed gear 117 of the first planetary gear assembly 110. The rotation of the internally toothed gear 117 causes the planet gears 120 to rotate in the forward direction. Accordingly, the sun gear 119 tends to rotate in the opposite direction, causing the sun gear 123, rotatable in unison with the sun gear 119, of the second planetary gear assembly 111 to tend to rotate in the opposite direction, thus causing the planet gears 124 to rotate in the forward direction. The one-way clutch 108 is operative to prevent the sun gear 123 from rotating the rear planet carrier 125 in the opposite direction, thus serving as a forward reaction brake. As a result, the internally toothed gear 122 of the second planetary gear assembly 111 rotates in the forward direction. It therefore follows that the output shaft 112 rotatable with the internally toothed gear 122 also rotates in the forward direction, thereby producing the first forward drive gear ratio. When, under this condition, the second brake 106 is applied after the vehicle speed has increased, similarly to the first gear condition, the power which has past through the input shaft 102 and the rear clutch is transmitted to the internally toothed gear 117. The second brake 106 is operative to fix the drum 126 to prevent rotation of the sun gear 119, thus serving as a reaction brake in the forward direction. Accordingly, the planet pinions 120 rotate and move along an orbit around the sun gear 119 which is held stationary with the result that the front planet carrier 121 and the output shaft 112 rotatable with the front planet carrier rotate in the forward direction at a speed, although with a reduction ratio, higher than the first gear condition, thereby producing the second forward drive gear ratio. When, after the vehicle speed has increased further, the second brake 106 is released and the front clutch 104 is engaged, the power delivered to the input shaft 102 splits into one part transmitted through the rear clutch 105 to the internally toothed gear 117 and into the remaining part transmitted through the front clutch 104 to the sun gear 119. Therefore, the internally toothed gear 117 and the sun gear 119 are interlocked with each other to rotate together with the front planet carrier 121 and the output shaft 112 at a common revolution speed in the forward direction, thereby producing the third forward drive gear ratio. Under this condition, the front clutch 104 and the rear clutch 105 may be referred to as an input clutch and there is no reaction brake so that the planetary gear assemblies do not lend themselves to multiplication of torque.

The power transmission path to be established when the selector lever is in the R (reverse drive gear) position will be hereinafter described.

When this position is selected, both of the front clutch 104 and the low-and-reverse brake 107 are engaged and applied, respectively. The power from the engine having past through the torque converter 101 is transmitted from the input shaft 102 through the front clutch 104 and the drum 126 to the sun gears 119 and 123. Since, under this condition, the rear planet carrier 125 is fixed by the low and reverse brake 107, the rotation of the sun gears 119 and 123 in the forward direction causes the internally toothed gear 122 to rotate at a reduced speed in the opposite direction with the result that the output shaft 112 rotatable with the internally toothed gear 122 rotates in the opposite direction, thereby producing the reverse drive gear ratio.

HYDRAULIC CONTROL SYSTEM

Figure 1:
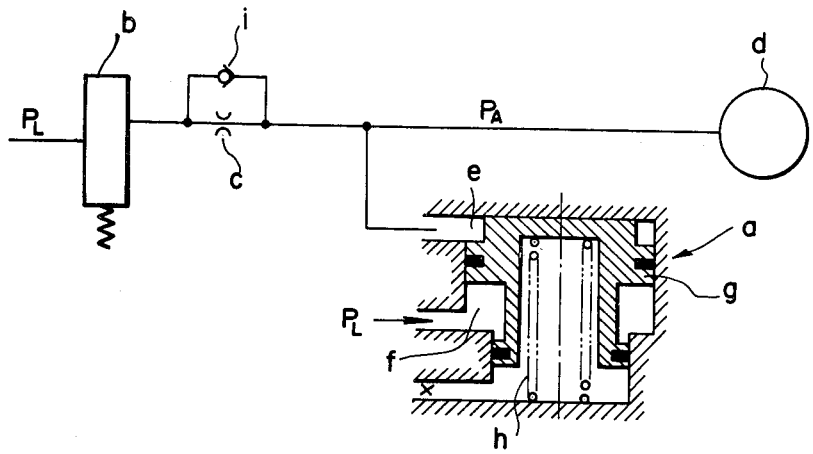
FIG. 1 is a diagram of a conventional gear shift shock reducing apparatus.
Figure 2:
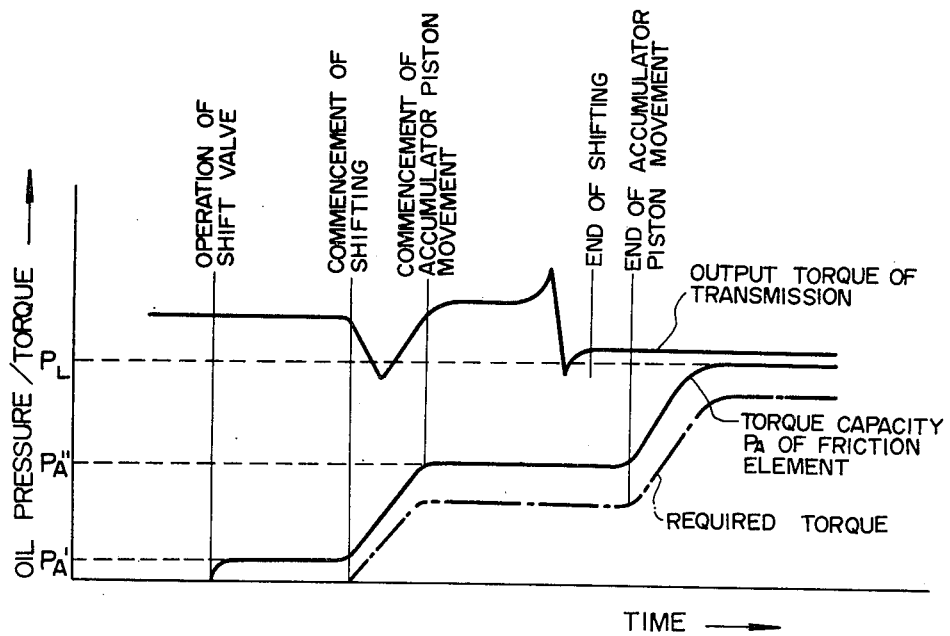
FIG. 2 is a torque capcity vs. time characteristic provided by the conventional apparatus shown in FIG. 1.
Figure 3:
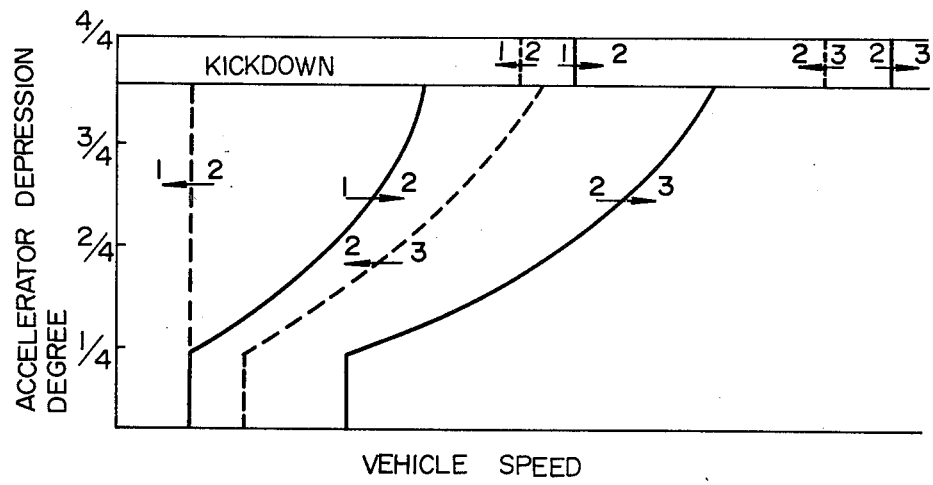
FIG. 3 is a graph showing a shift pattern curves of the automatic transmission.
Figure 5A:
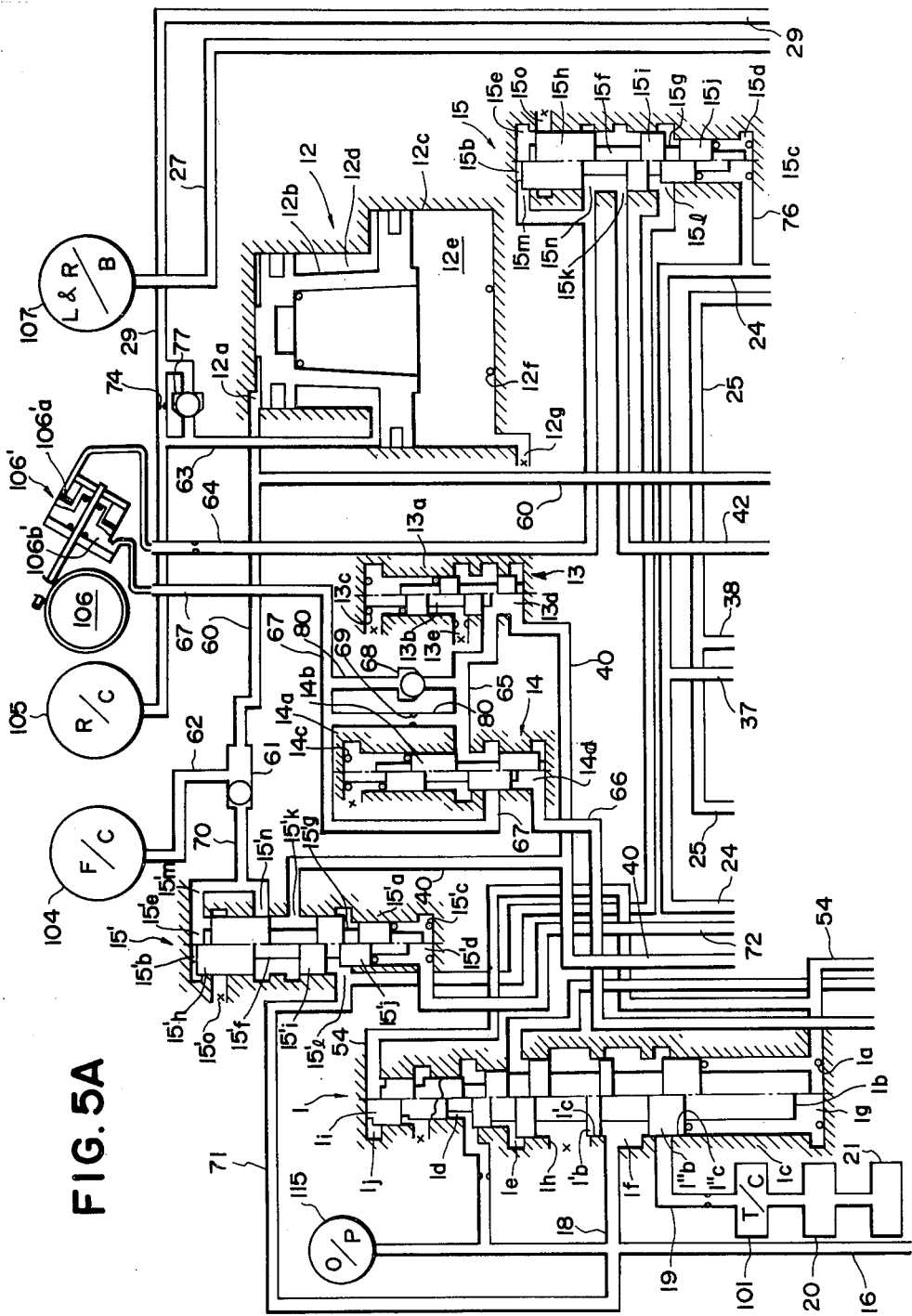
FIGS. 5A, 5B and 5C when combined show a shift shock reducing apparatus for a hydraulic control system of the automatic transmission according to the present invention.
Figure 5B:
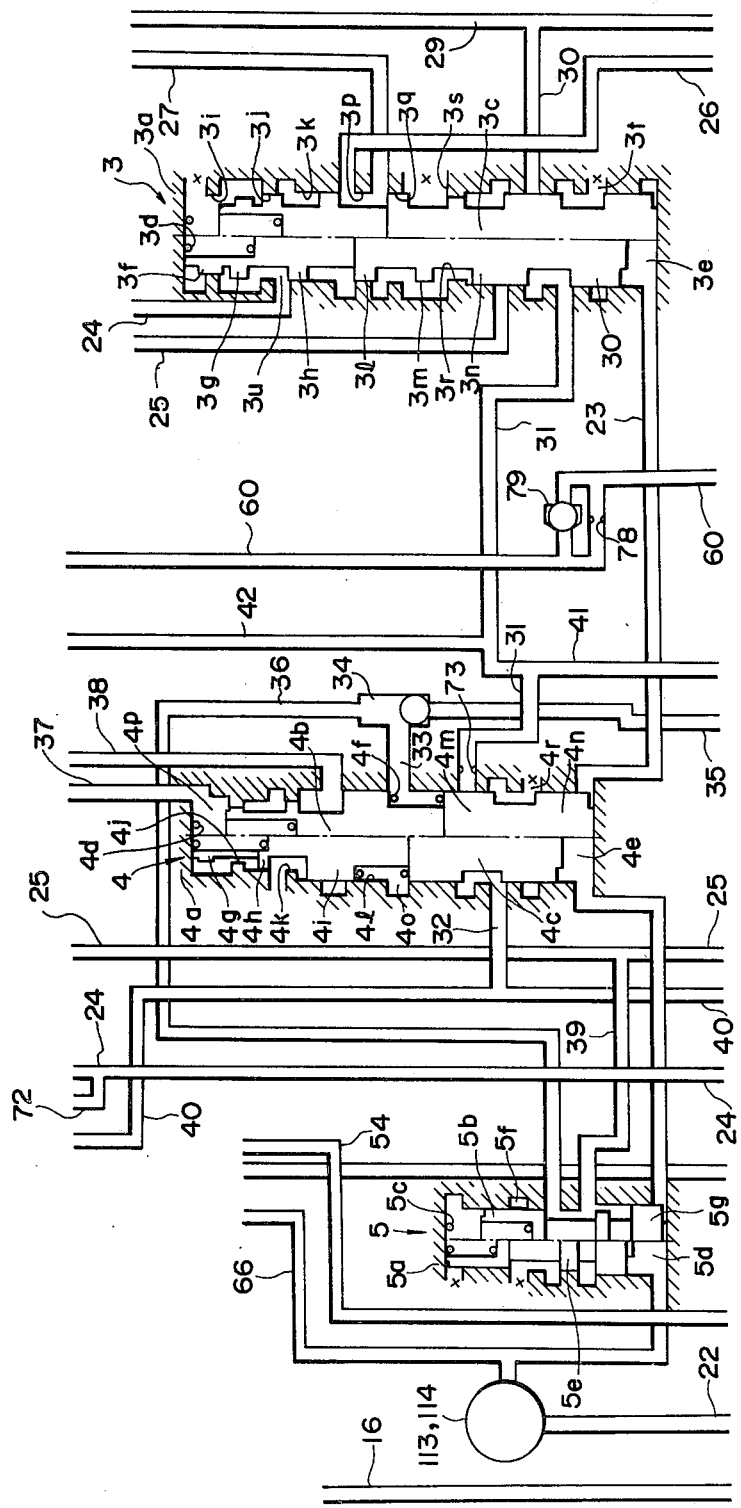
Figure 5C:
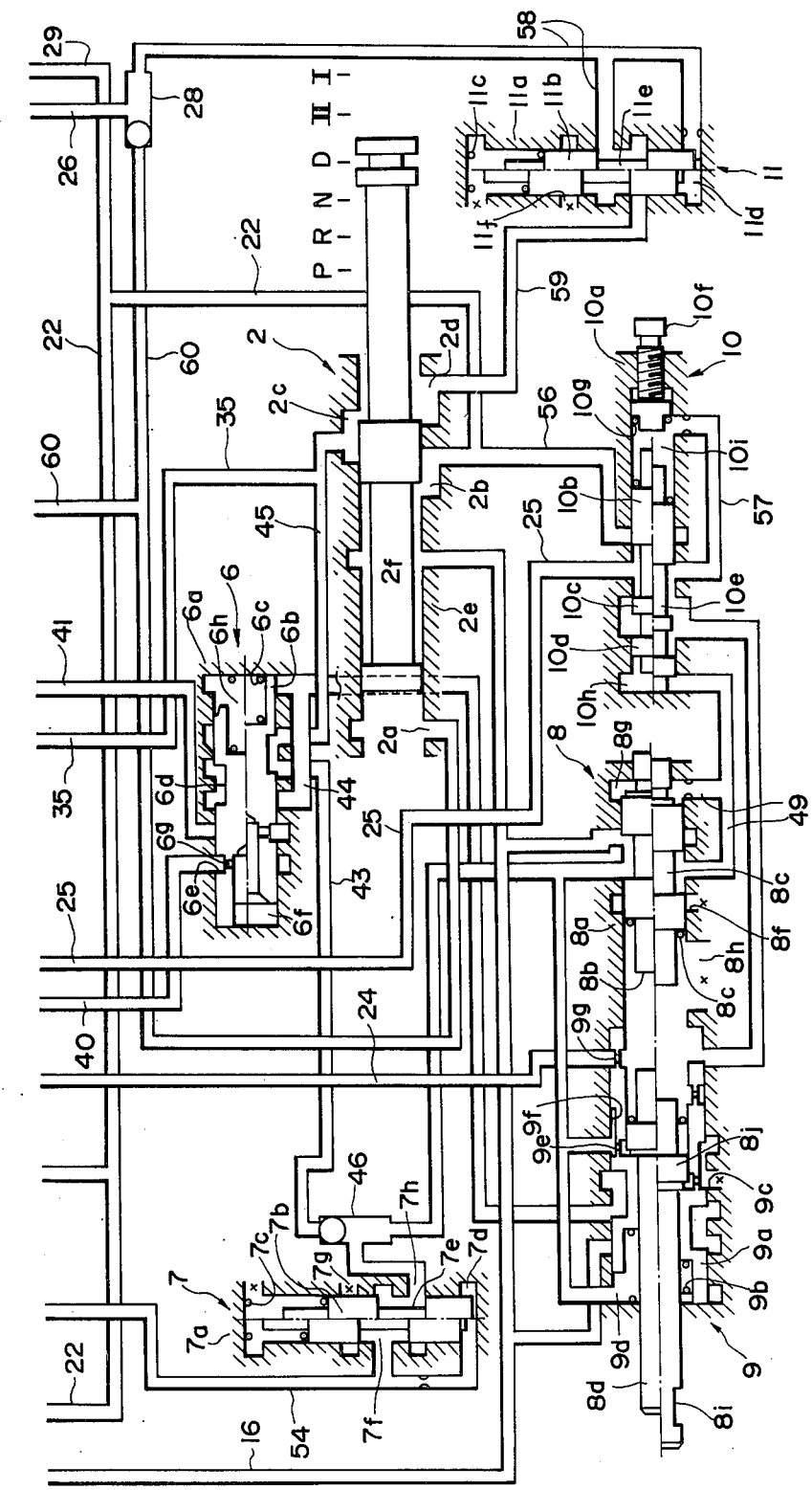

FIGS. 5A, 5B and 5C when combined show a hydraulic circuit diagram showing a gear shift shock reducing apparatus according to the present invention as incorporated in the hydraulic control system of the above described automatic transmission, which control system comprises a regulator valve 1, a manual valve 2, a 1-2 shift valve 3, a 2-3 shift valve 4, a 3-2 down shift valve 5, a line pressure booster valve 6, a pressure modifier valve 7, a throttle valve 8, a throttle failsafe valve 9, a throttle modulator valve 10, a pressure reducing valve 11 for a manual first gear range, an accumulator 12, a 2-3 timing valve 13, a 3-2 timing valve 14, and gear shift shock reducing valves 15 and 15', all these devices being connected through the illustrated circuit network to the torque converter 101, the rear clutch 105, a band brake 106' for said second brake (ref. FIG. 1), the low-and-reverse brake 107, the governor valves 113 and 114, and the oil pump 115; and the gear shift shock reducing apparatus comprises the pressure reducing valves 15 and 15' as the major component elements of the apparatus.

REGULATOR VALVE 1

Referring to FIG. 5A, the oil pump 115 is driven by the engine through the crank shaft 100 and the pump impeller P of the torque converter 101 and is operative to suck in an oil free from dust from an illustrated oil reservoir through an oil strainer (not shown) and feed the oil to a line pressure circuit 16 when the engine is in operation. The regulator valve 1 which is adapted to regulate the pressure of the oil to a predetermined level comprises a valve spool 1b, which is urged by means of a spring 1a to slidably move toward a raised position indicated by the left half of the spool in FIG. 5A, within a housing 1c, and also comprises four chambers 1d, 1e, 1f and 1g. To the chambers 1d and 1f are fed an oil pressure from the line pressure circuit 16 by way of oil passages 17 and 18, respectively. To the chamber 1e is fed a line pressure through an oil passage 22 from a port 2b of a manual valve 2 when the manual valve 2 assumes one of D, II and I ranges, as will be hereinafter described. A land 1'b of the spool 1b is slightly smaller, in diameter, than the inner diameter of the corresponding rib 1'c so as to define therebetween a small clearance which serves as a variable orifice. Through this clearance, the oil within the chamber 1f is drained off at all times by a drain port 1 at a rate which is determined by an amount of overlap between the 1'b and the rib 1'c thus allowing a line pressure to be produced within the line pressure circuit 16 which increases in proportion to the amount of overlap. A land 1"b of the spool 1b is slightly smaller than the bore 1"c of a housing 1c, thus defining therebetween a clearance, and through this clearance the oil within the chamber 1f is supplied through an oil passage 19 to the torque converter 101, an oil cooler 20 and various kinds of portions within the transmission which need lubrication.

MANUAL VALVE 2

The line pressure developed in the line pressure circuit 16 is directed to the manual valve 2 shown in FIG. 5C, which serves as a fluid-flow direction change-over valve adapted to provide communication from the line pressure circuit 16 selectively to any one of the ports 2a, 2b, 2c and 2d when the selector lever (not shown) is manipulated for gear selection, the valve comprising a valve spool 2f which is slidably mounted within a housing 2e. The valve spool 2f has six positions, viz., a neutral position (N), an automatic forward drive position (D), a manual second gear position (II), a manual first gear position (I), and a parking position (P) and allows the line pressure circuit 16 to commnicate with the ports indicated by the sign "o" in the following table when the spool 2f is moved selectively to each of the positions as a result of the above mentioned selecting operation. The ports which are not in communication with the line pressure circuit 16 are all made open to the openings on both sides of the housing 2e, thus serving as drain ports.

|  | Ports | | | |
|---|---|---|---|---|
| Ranges | 2a | 2b | 2c | 2d |
| P |  |  |  |  |
| R | o |  |  |  |
| N |  |  |  |  |
| D |  | o |  |  |
| II |  | o | o |  |
| I |  | o | o | o |

GOVERNOR VALVES 113, 114

Referring to FIG. 5B, the first governor valve 113 and the second governor valve 114 are operative to develop a governor pressure having a magnitude corresponding to a vehicle speed under forward driving condition of a vehicle. As will be understood from the Table as above, when the manual valve 2 is in any one of the forward drive gear positions D, II and I, the line pressure is first fed to the second governor valve 114 through the circuit 22 from the port 2b communicating with the line pressure circuit 16, and when the vehicle is running, the line pressure is regulated by the second governor valve 114, thus providing a governor pressure corresponding to the vehicle speed, this governor pressure being fed to the first governor valve 113. When the vehicle speed increases beyond a predetermined value, the first governor pressure 113 begins to allow the governor pressure being introduced thereto into the governor pressure circuit 23. This governor pressure is fed through the circuit 23 to the 1-2 shift valve 3, the 2-3 shift valve 4, and the 3-2 downshift valve 5 so as to regulate the operation of these valves in the manner described hereinlater.

1-2 SHIFT VALVE 3

Referring to FIG. 5B, the 1-2 shift valve 3 comprises within a housing 3a two valve spools 3b and 3c which are axially arranged in line with each other with their adjacent opposed end faces abutting with each other and which are slidably mounted. Acting upon that end face of the valve spool 3b which is more remote from the valve spool 3c is a spring 3d, while, that end face of the spool 3c which is more remote from the valve spool 3b is exposed to a chamber 3e. The valve spool 3b is formed with lands 3f, 3g, and 3k which are larger in diameter in this sequence, while, the housing 3a is formed with ribs 3i, 3j, and 3k which correspond to these lands, respectively. The valve spool 3c is further formed with lands 3l and 3m, and lands 3n and 3o which is larger, in diameter, than the former two, while, the housing 3a is formed with two ribs 3p and 3q cooperating with the land 3l and a rib 3r cooperating with the land 3m. As illustrated, connected to the 1-2 shift valve 3 are the governor pressure circuit 23, a kickdown pressure circuit 24, and a gear shift control pressure circuit 25, and further connected to the 1-2 shift valve is an oil passage 27 which is selectively and alternatively communicated with an oil passage 26 or a drain port 3s depending upon the axial position of the land 3l. The governor pressure circuit 23 communicates with the chamber 3e, while, the kickdown pressure circuit 24 is allowed to communicate with a groove between the lands 3f and 3g when the valve spool 3b is in the position indicated by the right half thereof or allowed to communicate with a groove between the lands 3g and 3h and a groove between the lands 3f and 3g when the valve spool 3b is in the position indicated by the left half thereof. The gear shift control pressure circuit 25 is allowed to communicate with a groove between lands 3m and 3n when the valve spool 3c is in the position indicated by right half thereof or blocked by the land 3n when the valve spool 3c is in the position indicated by the left half thereof. The oil passage 26 is connected to an outlet port of a shuttle valve 28, while, the oil passage 27 to the low-and-reverse brake 107. Connected further to the 1-2 shift valve 3 is an oil passage 30 extending from an oil passage 29 which leads to the rear clutch 105 after branching off from a halfway of the oil passage 22 that is directed from the port 2b of the manual valve 2 towards the governor valves 113 and 114, while, an oil passage 31, with which the oil passage 30 is allowed to communicate or prevented from communicating depending upon the axial position of the land 3n, is connected between the 1-2 shift valve 3 and the 2-3 shift valve 4. The oil passage 31 is allowed to communicate with a drain port 3t when the valve spool 3c is in the position indicated by the right half thereof. Disposed in the oil passage 29 are an orifice 74 and a check valve 77 arranged in parallel with the orifice.

2-3 SHIFT VALVE

As shown in FIG. 5B, the 2-3 shift valve 4 comprises within a housing 4a two valve spools 4b and 4c which are axially arranged in line with each other and have their adjacent end faces abutting with each other and which are slidably mounted. Acting upon that end face of a valve spool 4b which is more remote from a valve spool 4c is a spring 4d and that end face of the valve spool 4c which is more remote than the valve spool 4b is exposed to a chamber 4e, and a spring 4f is compressed between the valve spools 4b and 4c. The valve spool 4b is formed with lands 4g, 4h, and 4i which are larger in diameter in this sequence, while, the housing 4a is formed with ribs 4j, 4k, and 4l which cooperate respectively with these lands. The valve spool 4 is formed with two lands 4m and 4n, and connected to the 2-3 shift valve 4 is an oil passage 32 which, depending upon the axial position of the land 4m, is allowed to communicate with or prevented from communicating with the oil passage 31 provided with an orifice 73 (see FIG. 5B). The oil passage 32 is allowed to communicate with a drain port 4r when the valve spool 4c is in the position indicated by the right half thereof. Defined between the both of the valve spools 4b and 4c is a chamber 4c and this chamber is connected to an outlet port of a shuttle valve 34. This shuttle valve 34 has an inlet port connected through an oil passage 35, to the port 2c of the manual valve 2, while, it has the other inlet port connected to an oil passage 36. The chamber 4e is connected to the governor pressure circuit 23, and a chamber 4p accommodating therein a spring 4d is connected through an oil passage 37 to the kickdown pressure circuit 24. The kickdown pressure circuit 24 is connected to the 2-3 shift valve 4 in a manner as to allow the kickdown pressure to act upon the upper and lower pressure receiving faces of the land 4g and the upper pressure receiving face of the land 4h when the valve spool 4b is in the position indicated by the left half thereof. The shift control pressure circuit 25 is connected through an oil passage 38 to the 2-3 shift valve 4 in a manner as to allow the shift control pressure to act between the land 4h and the land 4i when the valve spool 4b is in the position indicated by the right half thereof, and a drain port 4q is provided to communicate with a groove between the land 4h and 4i when the valve spool 4b is in the position indicated by the left half thereof.

3-2 DOWNSHIFT VALVE 5

As shown in FIG. 5B, a 3-2 downshift valve 5 comprises a valve spool 5b slidably disposed within a housing 5a. The valve spool 5b has one end face acted upon by a spring 5c and the other end face of the valve spool is exposed to a chamber 5d. Connected to the 3-2 downshift valve 5 is said oil passage 36 which is allowed to communicate with an oil passage 39 extending from the shift control pressure circuit 25 or a drain port 5f depending upon the axial position of a drain port 5f, and a chamber 5d is connected to the governor pressure circuit 23.

LINE PRESSURE BOOSTER VALVE 6

Referring to FIG. 5C, a line pressure booster valve 6 comprises a valve spool 6b slidably within a housing 6a wherein the spool 6b is biased leftwards in the illustration of FIG. 5C by a spring 6c. The spool 6b is formed with grooves 6d and 6e and an oil passage 6g which communicates through this groove 6e with a chamber 6f. Connected to the line pressure booster valve 6 are an oil passage 40 which is allowed to communicate with the groove 6e when the spool 6b is in the leftmost position thereof as illustrated by the upper half and an oil passage 41 which is allowed to communicate with the groove 6e when the valve spool 6b is in the rightmost position. Having the oil passage 32 joining with it, the oil passage 40 leads to a 2-3 timing valve 13 and a pressure reducing valve 15' (see FIG. 5A), while, an oil passage 41 joins with the oil passage 31, and these passages are allowed to be connected through an oil passage 42 to a pressure reducing valve 15 (see FIG. 5A). Further connected to the line pressure booster valve 6 are an oil passage 43 which at all times communicates with the groove 6d and oil passages 44 and 45 which alternatively communicate with the oil passage 43 through the groove 6d depending upon the axial position of the valve spool 6b, and the oil passage 43 is connected to one inlet port of the shuttle valve 46, an oil passage 44 is connected through an oil passage 47 to a throttle failsafe valve 9 through an oil passage 47 extending from a chamber 6h accommodating therein a spring 6c, and the oil passage 45 is connected to the port 2c of the manual valve 2c.

THROTTLE VALVE 8

Referring to FIG. 5C, the throttle valve 8 comprises a valve spool 8b slidably disposed in a housing 8a, and a plunger 8d arranged axially in line with this spool through a spring 8c. The plunger 8d is operatively connected through a linkage with an accelerator pedal such that it is pushed rightwardly from an idling position as illustrated in FIG. 5C in the upper half depending upon depression amount of the accelerator pedal, thus increasing the spring force of the spring 8c. The valve spool 8b is formed with a groove 8e with which a throttle pressure circuit 48 and an oil passage 49 are connected at all times. The throttle valve 8 has a drain port 8f communicating with the throttle pressure circuit 48 through the groove 8e, an oil passage 50 extending from the line pressure circuit 16 opening thereto, and an oil passage 49 communicating with a chamber 8g. Increasing the force of the spring 8c by moving the plunger 8d rightwardly as the accelerator pedal is depressed causes a throttle pressure to be created within a chamber 8q by draining a part of the line pressure from the oil passage 50 to the drain port 8f so as to balance with the spring force so as to feed the throttle pressure to the throttle pressure circuit 48. Thus, the throttle valve 8 modifies the line pressure to provide the throttle pressure which varies in proportion to a throttle opening degree corresponding to the spring force of the spring 8c (the amount of depression of the accelerator pedal). When the accelerator pedal is depressed to a kickdown position, the plunger 8d compresses the spring 8c to be brought into abutting engagement with the spool 8b to push the spool 8b to its limit position closing the drain port 8f and allowing the throttle pressure circuit 48 to communicate with the oil passage 50 to permit the throttle pressure to increase to the same value as the line pressure.

THROTTLE FAILSAFE VALVE 9

As shown in FIG. 5C, the throttle pressure circuit 48 is connected with the other port of the shuttle valve 46 and is also connected through an oil passage 51 to the throttle failsafe valve 9. The throttle failsafe valve 9 comprises a sleeve 9a slidably disposed to guide the plunger 8d of the throttle valve 8 within the common housing 8a, where the leftward movement of the sleeve 9a is elastically resisted by a spring 9b. The oil passage 47 connecting the line pressure booster valve 6 with the throttle failsafe valve 9 is normally allowed to communicate with a drain port 9c of the throttle failsafe valve 9. The oil passage 51 communicates at one portion with a chamber 9d accommodating the spring 9b and at another portion with a chamber 9f to which an enlarged portion 8j of the plunger 8d is exposed, and a kickdown pressure circuit 24 communicates with a port 9g. To the throttle failsafe valve 9 an oil passage 52 branching off from the line pressure circuit 16 leads, and this oil passage is normally closed but will communicate with the oil passage 47 under abnormal condition when the sleeve 9a is in the lower half position thereof as illustrated in FIG. 5C as will be further described later. During movement of the plunger 8d as a result of said pushing, the throttle pressure within the throttle pressure circuit 48 is delivered through the oil passage 51 and the port 9e to a chamber 9f, acting upon the enlarged portion 8j to provide a force in the pushing direction against the spring 8c, thus preventing an increase in the manual effort upon depressing the accelerator pedal which otherwise would be caused by the spring 8c. When the plunger 8d is pushed to the kickdown position, the kickdown pressure circuit which has been in communication with the drain port 8h through a port 9g is isolated from the drain port and instead is allowed to communicate with the oil passage 51 through a port 9e, chamber 9f and port 9g. Under this condition, the valve spool 8b is pushed rightwardly to the position as described above to permit the line pressure within the oil passage 50 to be supplied to the throttle pressure circuit 48 without being drained, thus providing within the circuit 24 a kickdown pressure which is substantially equal to the line pressure. This kickdown pressure is also supplied through an oil passage 53 to a throttle modulator valve 10 (FIG. 5C). If a damage should take place in the mechanical linkage interconnecting the accelerator pedal and the plunger 8d, the plunger 8d is returned by a return spring (not illustrated) beyond the idling position which is indicated by the lower half of the plunger as illustrated, the sleeve 9a is moved leftwardly by being engaged by the plunger 8d to the lower half position as illustrated in FIG. 5C. Under this condition, substantially no force is imparted by the spring 8c upon the spool 8b, allowing the spool to slightly open the drain port 8f and to substantially close the oil passage 50. The oil passage 51 is allowed, under this condition, to communicate through the port 9e and chamber 9f with the drain port 9c, thus allowing the throttle pressure to decrease to zero, while, the oil passage 47 is allowed to communicate with the oil passage 52, thus permitting the line pressure to be delivered to the oil passage 47. The line pressure within the oil passage 47 is transferred through the line pressure booster valve 6, the oil passage 43 and the shuttle valve 46 to a pressure modifier valve 7, wherein the line pressure is modulated to a magnitude which is equal to the force of the spring 7c which is created when a spool 7b is in the position indicated by the left half thereof. The pressure modifier pressure, viz., an output pressure from the pressure modifier valve 7, is supplied through an oil passage 54 to chambers 1g and 1j of the regulator valve 1, the magnitude of the pressure modifier pressure taking the maximum magnitude under this condition, thus boosting the line pressure to its maximum value. As a result, the friction elements are gripped with the line pressure having its maximum value, thus allowing the automotive vehicle to run to a repair shop without any assistance and without causing a burnt damage due to a slip in the frictional elements.

PRESSURE MODIFIER VALVE 7

Referring to FIG. 5C, the pressure modifier valve 7 comprises a spool 7b slidably disposed within a housing 7a, which spool has one end face thereof being acted upon by a spring 7c and the other end face being exposed to a chamber 7d. The valve spool 7b is formed with a groove 7e, while, the housing 7a is formed with an output port 7f which is at all times open to this groove, a drain port 7g, and an inlet port 7h. The ports 7g and 7h are arranged in such a manner that, during movement of the valve spool, the valve spool begins to open one of the ports when it is about to completely close the other port. The port 7f is connected through the oil passage 54 to the chamber 7d, to the chamber 1g of the regulator valve 1, and to the chamber 1j to which a plug 1i arranged in opposite relation to the valve spool 1b is exposed. A port 7h is connected to an outlet port of the shuttle valve 46.

With the pressure modifier valve 7, therefore, the spring 7c holds the valve spool downwards in the position indicated by the left half in FIG. 5C when the oil pressure fed to the port 7h is lower than a set value (the spring force of the spring 7c when the valve spool 7b is in the left half position in FIG. 5C), thus isolating the port 7f from the drain port 7g and communicating the former with the port 7h, so that the oil pressure fed to the port 7h is supplied through the port 7f and the oil passage 54 to the regulator valve 1 without any modulation. Under this condition, since the oil pressure is transferred also to the chamber 7d, the valve spool 7b is pushed to move against the spring force of the spring 7c from the position indicated by the right half as viewed in FIG. 5C drawing toward the position indicated by the left half as viewed in FIG. 5C as the oil pressure increases. However, if the oil pressure at the port 7f tends to increase further, the valve spool 7b moves upwardly beyond the position indicated by the left half as viewed in FIG. 5C, thus communicating the port 7f also with the drain port 7g with the result that the oil pressure provided to the oil passage 54, viz., the pressure modifier pressure, will not increase beyond that level which is determined by the spring force of the spring 7c when the valve spool 7b is in the position indicated by the left half in the drawing.

THROTTLE MODULATOR VALVE 10

Referring to FIG. 5C, the throttle modulator valve 10 comprises a valve spool 10e with three lands 10b, 10c, and 10d slidably disposed within a housing 10a, which spool having one end face being acted upon by a spring 10g whose spring force is adjustable and the other end face thereof exposed to a chamber 10h. An oil passage 25 is connected to the housing 10a in such a manner that it communicates at all times with a groove between the lands 10b and 10c of the spool 10e. The oil passage 53 and an oil passage 56 extending from the port 2b of the manual valve 2 are connected to the housing 10a in such a manner that, during the movement of the valve spool 10e, the valve spool 10e begins to open one of the oil passages when it is about to completely close the other oil passage. An oil passage 57 is connected to the housing 10a at a position corresponding to the connecting portion of the circuit 25 to the housing and is connected to a chamber 10i accommodate a spring 10g. A chamber 10h is allowed to communicate with the throttle valve 8 through an oil passage 49.

With the throttle modulator valve 10, when the throttle pressure transferred through the oil passage 49 to the chamber 10h is at a zero level, the spool 10e is held in the position indicated by the lower half as viewed in FIG. 5C by means of the spring 10g. Under this condition, with the spool land 10b, the oil passage 56 from the manual valve 2 is isolated from the circuit 25 and the oil passage 57 and at the same time the gear shift control pressure circuit 25 and the oil passage 57 are allowed to communicate through the oil passage 53 and the port 9g of the throttle failsafe valve 9 with the drain port 8h, thus preventing a pressure build-up in the circuit 25 and in the oil passage 57. As the throttle pressure increases, the valve spool 10e tends to be moved beyond the position indicated by the upper half as viewed in FIG. 5C. However, when the line pressure is transferred from the port 2b of the manual valve 2 through the oil passage 56 to the throttle modulator valve 10, this line pressure is transferred through the oil passage 57 to the chamber 10i so as to move the valve spool 10e back to the illustrated upper half position in cooperation with the spring 10g, thus allowing the valve spool 10e to balance in this position. Thus, the throttle modulator valve 10 is capable of regulating the line pressure from the oil passage 56 in response to the throttle pressure transferred to the chamber 10h and providing a throttle modulator pressure to the shift control pressure circuit 25, which throttle modulator pressure appears in response to a throttle opening degree at for example 2/4 of the full opening degree and thereafter varies in proportion to the throttle opening degree larger than the two fourth of the full opening degree. Under the kickdown condition when the plunger 8d of the throttle valve 8 is pushed inwardly, the port 9g is isolated from the drain port 8h as mentioned before and thus the throttle pressure having the magnitude equal to the level of the line pressure is supplied from the port 9g through the oil passage 53 to the throttle modulator valve 10, so that the pressure having a magnitude equal to the line pressure appears in the shift control pressure circuit 25 and the oil passage 57 and this pressure transferred to the chamber 10i acts to push and move the valve spool 10e leftwardly to the limit position thereof, with the result that the pressure equal to the line pressure appears in the circuit 25 under the kickdown condition.

MANUAL FIRST GEAR RANGE PRESSURE REDUCING VALVE 11

Referring to FIG. 5C, the manual first gear range pressure reducing valve 11 comprises a valve spool 11b slidably disposed in a housing 11a, which valve spool has one end face acted upon by a spring 11c and the other end face exposed to a chamber 11d. The valve spool 11b is formed with a groove 11e, and an oil passage 58 is connected to the housing 11a to communicate at all times with this groove and the oil passage 58 communicates also with an inlet port of the shuttle valve 28 and with the chamber 11d. The housing 11a is formed further with a drain port 11f and has the oil passage 59 from the port 2d of the manual valve 2 connected thereto and they are arranged such that, during movement of the valve spool 11b, the valve spool 11b begins to open one of the drain port 11f and the oil passage 59 when it is about to completely close the other one. Thus, the manual first gear range pressure reducing valve 11 is operative when the first (I) range is selected to effect a pressure reduction by partially draining the line pressure fed to the oil passage 59 from the manual valve 2 so as to provide to the oil passage 58 a constant reduced pressure which is determined by that spring force of the spring 11c when the valve spool is in the position indicated by the left half thereof, thus preventing the low-and-reverse brake, which is to be also used in the reverse drive gear, from having an excessively large capacity.

The port 2a of the manual valve 2 is connected through an oil passage 60 to the other inlet port of the shuttle valve 28 (see FIG. 5C) and also to one inlet port of the shuttle valve 61 (see FIG. 5A), an outlet port of which shuttle valve communicates with a front clutch 104 through an oil passage 62 (see FIG. 5A). Halfway of the oil passage 60 is provided an orifice 78 and a check valve 79 arranged in parallel to the orifice 78, and the upstream of the orifice has a branch communicating with a chamber 12a of the accumulator 12. This accumulator comprises a stepped piston 12b and a stepped cylinder having the piston slidably fitted therein for defining further two chambers 12d and 12e in addition to the above mentioned chamber 12a, wherein the piston 12b is biased upwardly in the drawing by a spring 12f. The chamber 12d communicates through an oil passage 63 with the oil passage 29, while, the chamber 12e is open to the atmosphere through an atmosphere port 12g.

2-3 TIMING VALVE 13

Referring to FIG. 5A, the 2-3 timing valve 13 comprises a valve spool 13b slidably disposed in a housing 13a, which spool has one end face acted upon by a spring 13c and the other end face exposed to a chamber 13d communicating with the oil passage 40. The valve spool 13b is biased downwardly by the spring 13c and takes a lower position as indicated by the right half as viewed in FIG. 5A, allowing communication of the oil passage 65 with the drain port 13e, or a raised position as indicated by the left half as viewed in FIG. 5A in the drawing, allowing communication of the oil passage 65 with the oil passage 40 through the chamber 13d.

3-2 TIMING VALVE 14

Referring to FIG. 5A, the 3-2 timing valve 14 comprises a valve spool 14b slidably disposed in a housing 14a which spool has one end face acted upon by a spring 14c and the other end face exposed to a chamber 14d. The spool 14b is responsive to the governor pressure delivered to the chamber 14d from the governor pressure circuit 23 through an oil passage 66, and the spool 14b takes a lower position as indicated by the right half as viewed in FIG. 5A, permitting communication of the oil passage 65 with an oil passage 67 extending to a servo release chamber 106b' of the band servo 106' or a raised position as indicated by the left half as viewed in FIG. 5A, isolating the oil passage 65 from the oil passage 67. Between the oil passages 65 and 67 is arranged a parallel circuit 80 of a check valve 68 and an orifice 69, which parallel circuit bypasses the 3-2 timing valve 14.

PRESSURE REDUCING VALVES 15, 15'

Referring to FIG. 5A, the pressure reducing valves 15 and 15' for reducing shift shock have an identical construction and have a spool 15b(15'b) slidably disposed in a housing 15a(15'a). The spool 15b(15'b) has one end face acted upon by a spring 15c(15'c) and is also exposed to a chamber 15d(15'd), and has the other end face thereof exposed to a chamber 15e(15'e). The spool 15b(15'b) is formed with two grooves 15f and 15g(15'f and 15'g), lands of the same diameter 15h and 15i(15'h and 15'i), and a land 15j(15'j) having a smaller diameter than the other two lands. The housing 15a(15'a) is formed with ports 15k and 15(15'k and 15'l) which at all times communicate with the groove 15f and 15g(15'f and 15'g), respectively, a port 15m(15'm) opening to a chamber 15e(15'e), a port 15n(15'n) whose opening area is gradually decreased by the land 15h(15'h) as the spool 15b(15'b) moves downwardly from a raised position, as indicated by the left half in the drawing, toward a lowered position, as indicated by the right half in the drawing, and a drain port 15o(15'o), which is allowed by the land 15h(15'h) to communicate with the chamber 15e(15'e) when the spool 15b(15'b) moves downwardly beyond the position indicated by the right half as viewed in FIG. 5A.

The pressure reducing valve 15' is arranged to reduce a shift shock during a 2-3 upshift, and, for this purpose, the oil passage 40 from the line pressure booster valve 6 and the 2-3 timing valve 13 is connected to the port 15'k and an oil passage extending from the other inlet port of the shuttle value 61 is connected to the ports 15'm and 15'n. Connected to the port 15'l is an oil passage 71 branching off from the line pressure circuit 16, and connected to the chamber 15'd is an oil passage 72 branching off from the kickdown pressure circuit 24.

The pressure reducing valve 15 is arranged to reduce the shift shock during 1-2 upshift, and, for this purpose, the oil passage 42 from the 1-2 shift valve 3, the line pressure booster valve 6 and the 2-3 shift valve 4 is connected to the port 15k, and an oil passage 64 extending from a servo apply chamber 106'a of the band servo 106' is connected to the ports 15m and 15n. Connected to the port 15l is an oil passage 75 branching off from a midpoint of the oil passage 71, and connected to the chamber 15d is an oil passage 76 branching off from the kickdown pressure circuit 24.

OPERATION

The operation of the hydraulic control system provided with the apparatus according to the present invention will be explained in the following.

The regulator valve 1 is supplied with the pump pressure transferred to the chamber 1d from the oil pump 115, the pressure modifier pressure transferred to the chamber 1i from the pressure modifier valve 7, and the line pressure transferred to the chamber 1e from the port 2b of the manual valve 2 only when the D range or II range or I range is selected, thus applying a force urging the valve spool 1b downwardly as viewed in FIG. 5A, while, the pressure modifier pressure is transferred to the chamber 1g to urge the valve spool 1b upwardly as viewed in FIG. 5A together with the spring force of the spring 1a. Thus, the valve spool 1b takes a position where the forces applied thereto are balanced, thereby to develop in the circuit 16 the line pressure which is determined by such a position of the valve spool 1b, and this line pressure is at all times transferred to the corresponding port of the manual valve 2. When the P range or R range or N range is selected, the chamber 1e of the regulator valve 1 is drained through the port 2b of the manual valve 2, and, as a result, there occurs no force which otherwise would be caused by the pressure in the chamber 1e effective to urge the valve spool 1b downwardly because of the absence of the line pressure within this chamber, resulting in an increase in the line pressure in the circuit 16 as compared to the line pressure developed when the D range or II range or I range is selected.

When the driver moves the manual valve 2 from the N range to the D range, the line pressure circuit 16 is permitted to communicate with the port 2b and the line pressure in the port 2b is allowed to reach the throttle modulator valve 10 on one hand through the oil passage 56, and on the other hand allowed to reach the rear clutch 105 through the oil passages 22 and 29. The line pressure transferred through the oil passage 56 to the throttle modulator valve 10 is modulated to provide said throttle modulator pressure by this valve and is transferred to the oil passage 25. The line pressure passing through the oil passage 29 is restricted by the orifice 74 before reaching the rear clutch 105 so that the pressure fed to the rear clutch 105 is initially low and thereafter increases at a gradual rate. The rear clutch supply pressure reaches through the oil passage 63 to an accumulator chamber 12d, thus pushing down the stepped piston 12b toward the larger diameter side against the spring 12f. This causes a slow increase in the rear clutch supply pressure, thus enabling the rear clutch 105 to couple softly without any shock when the manual valve 2 is moved from the N range to the D range, with the result that with the coupling of the rear clutch 105, the automatic transmission is conditioned for enabling the vehicle to start.

The line pressure appearing into the oil passage 22 from the port 2b of the manual valve 2 is delivered also to the governor valves 113 and 114, thus allowing the governor valves to provide the before mentioned governor pressure in the circuit 23 which corresponds to the vehicle speed. The governor pressure is at all times transferred to the governor pressure circuit 23 when the manual valve 2 is in the forward speed ranges (D), (II) and (I) because during these forward speed ranges, the port 2b of the manual valve 2 communicates with the line pressure circuit 16 to allow the line pressure to be transferred to the oil passage 22.

When the vehicle speed reaches a certain value after the automotive vehicle has started, the governor pressure corresponding to this vehicle speed and reaching the chamber 3e from the circuit 23 overcomes the downward force by the spring 3d exerted upon the spools 3b and 3c in the position indicated by the right half as viewed in FIG. 5B and the downward force caused by the throttle modulator pressure from the circuit 25 and acting upon the differential pressure receiving areas of the lands 3m and 3n, thus moving the spools 3b and 3c upwardly from the position indicated by the right half in the drawing. During this movement of the spools, when the land 3m is moved beyond and disengaged from the rib 3r, the chamber defined between the lands 3m and 3n is allowed to communicate with the drain port 3s, eliminating the downward force which has been exerted on the valve spool 3c by the throttle modulator pressure from the circuit 25, thereby causing the valve spools 3b and 3c to move instantaneously into the position indicated by the left half in the drawing. As a consequence, the oil passage 30 branching off from the oil passage 29 is allowed to communicate with the oil passage 31, thus allowing the line pressure in the oil passage 29 into the oil passage 31 through the oil passage 30 and the 1-2 shift valve 3. This line pressure is subsequently supplied through the oil passage 42 to the pressure reducing valve port 15k. This pressure acts through the valve 15, from the port 15n through the oil passage 64 to the servo apply chamber 106'a of the band servo 106' because the spool 15b is in the raised position indicated by the left half as viewed in FIG. 5A as a result of an upwardly directed force due to the line pressure in the oil passages 71 and 75 communicating with the line pressure circuit 16 and the port 15l, and due to the spring 15c. The servo apply pressure at this chamber is delivered through the port 15m also to the chamber 15e, thus urging the spool 15b downwardly. Referring to the servo apply chamber pressure (represented by Ps hereinafter), as will be apparent from the characteristic curve x shown in FIG. 6 together with the output shaft torque during shifting, the servo apply pressure takes a value Ps' determined by the sliding resistance in the actuating portion during a duration beginning with an instance when the line pressure begins to be delivered to the servo apply chamber 106'a as a result of the action of the 1-2 shift valve 3 and ending with an instance when the band servo 106' begins to apply the second brake 106 (see FIG. 4) as a result of the application of the line pressure to the servo apply chamber 106'a to initiate the shifting operation. After the band servo 106' begins to apply the second brake to initiate the shifting operation, the servo apply pressure Ps increases toward a pressure value Ps". During this servo pressure increase the value Ps', a downwardly directed force exerted on the valve spool 15b caused by the servo apply pressure Ps in the chamber 15e balance with an upwardly directed force exerted on the valve spool 15b caused by the line pressure $P_L$ in the port 15l and the spring 15c. This balanced state of forces exerted on the spool 15b can be expressed by the following equation.

$$Ps \times S = P_L \times D + F$$

Thus, $$P_s = (D/S)P_L + (F/S) \qquad (3)$$

where: F represents the spring force of the spring 15c, S represents the pressure receiving area of the spool 15b exposed to the chamber 15e, and D represents the pressure receiving area difference where the line pressure occurring in the port 15l acts.

Although, as the servo apply pressure Ps increases, the valve spool 15b is moved downwardly from the raised position to the position indicated by the right half in the drawing, the value Ps'' of the servo apply pressure chamber at this instance can be expressed by the following equation using the above equation (3), where the spring force of the spring 15c at this instance is represented by F'.

$$P_s'' = (D/S)P_L + (F'/S) \qquad (4)$$

When, however, the servo apply pressure Ps tends to increase beyond this value Ps'', this causes the valve spool 15b to move further downwardly from the position indicated by the right half, letting its land 15h close the port 15n and open the drain port 15o, thus draining the excessive oil, with the result that the pressure reducing valve 15 carrys out a pressure reducing function to maintain the servo apply pressure Ps at the value Ps''. With the servo apply pressure Ps varying in this manner, the band servo 106' actuates the second brake 106, thus making a shift from the first gear ratio to the second gear ratio with the rear clutch 105 being in coupled condition.

Figure 6:
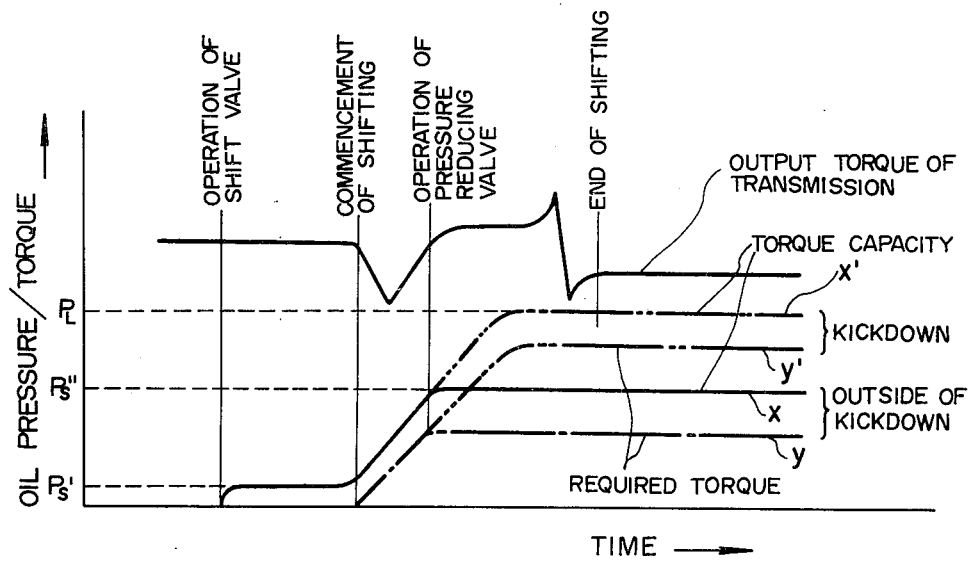
FIG. 6 is a torque capacity vs. time characteristic provided by the apparatus shown in FIG. 5.

With the pressure reducing valve 15 functioning in this manner, if the pressure receiving areas S and D of the valve spool 15b and the spring force F' of the sprin 15c are appropriately selected, the varying characteristic of the servo apply pressure Ps (the torque capacity of the second brake 106) as shown at x in FIG. 6 is provided which approximates the required torque characteristic y of the second brake 106, but at a value slightly larger than that of the second brake 106. Thus, the torque capacity of the second brake 106 is reduced without any slip in the second brake, thus alleviating a shift shock otherwise occurring during the upshift from the first gear ratio to the second gear ratio. It is to be noted that since the line pressure, varying in accordance with the driving torque of the engine, is transferred to the port 15l from the oil passage 75, the servo apply pressure Ps decreases with the magnitude of the engine driving torque, thus providing the servo apply pressure Ps having the required minimum oil pressure.

As the vehicle speed further increases when the vehicle runs with the second gear ratio, the governor pressure corresponding to the vehicle speed and delivered through the circuit 23 to the chamber 4e of the 2-3 shift valve 4 overcomes the downward force exerted on the spools 4b and 4c, which are in the position indicated by the right half as viewed in FIG. 5B, by the spring 4d and the downward force exterted on these valve spools by the throttle modulator pressure from the circuits 25 and 38 acting on the difference between the pressure-acting area of that of the land 4h and the land 4i, thereby causing the valve spools 4b and 4c to move upwardly from the position indicated by the right half as viewed in FIG. 5B. During this movement, when the land 4h is moved beyond and disengaged from the rib 4k, the chamber defined between the lands 4h and 4i is allowed to communicate with a drain port 4q, thus eliminating the downward force due to said throttle modulator pressure, allowing the valve spools 4b and 4c to instantaneously move upwardly into position indicated by the left half as viewed in FIG. 5B. As a consequence, the oil passage 31 is allowed to communicate with the oil passage 32, permitting the line pressure transferred to the oil pressure 31 to be transferred through the 2-3 shift valve 4 and the oil passage 32 to the oil passage 40. This line pressure in the oil passage 40 is transferred through the passages 6e and 6g of the line pressure booster valve 6 to the chamber 6f, urging the spool 6b to move rightwardly against the spring 6c from the position indicated by the upper half as viewed in FIG. 5C to the position indicated by the lower half as viewed in FIG. 5C. This pressure is also transferred to the chamber 13d of the 2-3 timing valve 13 and the corresponding port 15'k of the pressure reducing valve 15'. The line pressure in the oil passage 40 is restricted by the orifice 73, positioned at the opening of the passage 31 into the 2-3 shift valve port 4c. Therefore, when the 2-3 shift valve opens communication between the passages 31 and 32, the pressure in passages 32 and 40 increases initially at a low value and thereafter at a gradual rate. Therefore, the oil pressure transferred to the chamber 13d from the oil passage 40 is unable to move the valve spool 13b against the spring 13c initially, thus maintaining the valve spool 13a in the position indicated by the right half as viewed in FIG. 5A and blocking the delivery of the pressure. Since the pressure reducing valve 15' performs the indentical function as the pressure reducing valve 15, the oil pressure from the oil passage 40 to the pressure reducing valve 5' is initially transferred through the port 15'k, the port 15n', the oil passage 70, the shuttle valve 61, and the oil passage 62 to the front clutch 104. When the 2-3 shift valve 4 opens to communicate the passage 31 with the passage 32, the pressure in the oil passage 40 increases and is transferred to the front clutch 104. This pressure is subjected to the pressure reducing function performed by the pressure reducing valve 15' so that the pressure transferred to the front clutch 104 is not the line pressure itself but a pressure resulting from the reduction, as explained before, of the line pressure. During this action, when the pressure in the oil passage 40 has increased to that value which overcomes the spring 13c of the 2-3 timing valve 13, this pressure urges the valve spool 13b to move upwardly from the position indicated by the right half as viewed in FIG. 5A to the position indicated by the left half as viewed in FIG. 5A, thus allowing the chamber 13d to communicate with the oil passage 65 thereby to permit the pressure having been transferred to the chamber 13d from the oil passage 40 to appear in the oil passage 65. The pressure is transferred from the oil passage 65 through the oil passage 80 provided with a check valve 68 and the oil passage 67 to the servo release chamber 106b'. When the line pressure is transferred to the servo release chamber 106b', the piston of the band servo 106' is pushed back toward the servo-apply chamber 106'a because the pressure receiving area of the piston on the servo-apply chamber 106'a side is larger than that on the servo-release chamber 106'b side. With the operation thus described, after the pressure supplied to the front clutch 104 is increased beyond a certain value to cause the front clutch to commence its coupling, the supply of pressure to the servo release chamber 106b' is effected (viz., the second brake 106 is released by the band servo 106') so that the coupling of the front clutch 104 is slightly overlapped in time with the actuation of the second brake 106, so as to prevent the engine from racing which would otherwise occur if the front clutch 104 and the second brake 106 are allowed to be inoperative concurrently, making an upshift from the second gear ratio to the third gear ratio in the automatic transmission as a result of the coupling of the front clutch 104 in cooperation with the rear clutch 105 being held coupled.

During an upshift from the second gear ratio to the third gear ratio, since the pressure reducing valve 15' perform the function of regulating the front clutch pressure to provide the necessary minimum value, the torque capacity of the front clutch 104 is maintained at approprioate value, thus alleviating the shift shock without causing any slip. In this case too, since the line pressure which varies in response to the engine driving torque is delivered to the port 15*l* from the oil passage 75, and thus the front clutch pressure is reduced in response to the magnitude of the engine driving torque, the front clutch pressure is maintained at the necessary minimum value.

When the automotive vehicle is running with the third gear ratio at a vehicle speed higher than a predetermined value, the governor pressure corresponding to this vehicle speed and transferred from the circuit 23 to the chamber 5*d* of the 3-2 shift valve 5 causes the valve 5 spool 5*b* of said valve to take the upward position as indicated by the left half as viewed in FIG. 5B. If, now, the accelerator pedal is depressed to increase the throttle opening degree, the throttle modulator pressure corresponding to this throttle opening is delivered from the shift control circuit 25 to the 3-2 downshift valve 5 through the oil passage 39 and acts on the difference between the pressure-acting area of the land 5*e* and that of the land 5*g*, pushing the valve spool 5*b* downwardly to the position indicated by the right half as viewed in FIG. 5B in cooperation with the spring 5*c*. This allows the oil passage 36 to communicate with the oil passage 39, permitting the throttle modulator pressure to be fed to the chamber 4*o* of the 2-3 shift valve 4 through the oil passages 39 and 36 and the shuttle valve 34, pushing the valve spool 4*c* against the governor pressure within the chamber 4*e* from the position indicated by the left half as viewed in FIG. 5B to the position indicated by the right half as viewed in FIG. 5B. The oil passage 31 is now isolated from the oil passage 32 to prevent the supply of line pressure to the oil passage 32, and at the same time the oil passage 32 is allowed to communicate with the drain port 4*r*, thus permitting the pressure having been transferred to the front clutch 104 and the servo release chamber 106'*b* under the third gear ratio condition to be discharged in the manner described hereinafter. Viz., the front clutch pressure is relatively quickly discharge through the oil passage 40, the shuttle valve 61, the oil passages 70, 40 and 32, and the drain port 4*r* because the valve spool 15*b'* urged by the spring 15*c'* is allowed to assume the position indicated by the left half as viewed in FIG. 5B as a result of the elimination of the front clutch pressure within the chamber 15'*e* of the pressure reducing valve 15'*b* to provide communication between the oil passages 40 and 70. The servo release pressure is discharged at a slow rate through the oil passage 67, the oil passage 80, the orifice 69, the oil passage 65 and the drain port 13*e* because the valve spool 13*b* urged by the spring 13*b* is allowed to assume the position indicated by the right half as viewed in FIG. 5A as a result of the elimination of the pressure from the chamber 13*d* of the 2-3 timing valve 13. If, now, the vehicle speed is decreased to a relatively low level, the governor pressure corresponding to this vehicle speed transferred from the governor pressure circuit 23 to the chamber 14*d* of the 3-2 timing valve 14 is not capable of moving the valve spool 14*b* upwardly against the spring 14*c* to the position indicated by the left half as viewed in FIG. 5A, thus allowing the valve spool 14*d* to move downwardly to the position indicated by the right half as viewed in FIG. 5A, permitting communication between the oil passages 65 and 67. In this case, the servo release pressure is discharged through the oil passage 67, the 3-2 timing valve 14, the oil passage 65 and the drain port 13*e* at a rate which is comparatively quicker than the rate to be achieved when the vehicle speed is at a relatively high value as previously described. Owing to the operation previously described, the servo release pressure is discharged, when compared with the discharge rate of the front clutch pressure, at a relatively slow rate determined by the flow rate of oil through the orifice 69 when the vehicle speed is high and at a relatively quick rate when the vehicle speed is low. For the reason, the actuation of the band servo 106' (the second brake 106) is delayed as compared with the timing at which the front clutch 104 is disengaged at high vehicle speeds, thereby making it possible to achieve a prolonged neutral interval during which the engine is enabled to increase its output speed to a value to match the vehicle speed while a downshift is being made from the third gear ratio to the second gear ratio without any shift shock. At low vehicle speeds, the amount of delay in the actuation of the second brake 106 as compared with the timing at which the front clutch 104 is to be disengaged is reduced so that the amount of delay provides a duration of time which is required for the engine to increase its engine speed to a level corresponding to the vehicle speed, thereby making it possible to reduce the shift shock during the above described downshift.

It may be mentioned that, when the vehicle speed and accordingly the governor pressure in the chamber 5*d* decreases, the 3-2 downshift valve 5 (see FIG. 5B) performs the function similar to that which this valve performs in response to an increase in the throttle opening degree as above described, making it possible to make a downshift from the third gear ratio to the second gear ratio.

As the vehicle speed further decreases, the governor pressure in the chamber 3*e* of the 1-2 shift valve 3 is incapable for overcoming the spring force of the spring 3*d*, thus allowing this spring 3*d* to move the valve spools 3*b* and 3*c* downwardly from the position indicated by the left half in the drawing to the position indicated by the right half as viewed in FIG. 5A thereby to isolate the oil passge 31 from the oil passage 30 and to communicate the oil passage 31 with the drain port 3*t*. Due to a drop in pressure in the chamber 15*e*, the spool 15*b* of the pressure reducing valve 15 under the action of the spring 15*c* takes the position indicated by the left half in the drawing to allow communication between the ports 15*k* and 15*n*, and as a result the oil pressure delivered to the servo apply chamber 106'*a* is discharged through the oil passages 64 and 42, the oil passage 31, thus causing the band servo 106' to release the second brake 106. Among the friction elements, only the rear clutch 105 is now held engaged so that a downshift is effected from the second gear ratio to the first gear ratio in the automatic transmission.

When the manual valve 2 is thereafter moved back to the N range, the port 2*b* is drained off so that the line pressure which has been transferred to the rear clutch 105 is discharged through the oil passage 29 and renders all the frictional elements of the automatic transmission inoperative, producing a neutral condition wherein the transmission of the power is interrupted.

When the accelerator pedal is fully depressed to produce a kickdown condition when the vehicle is running with said third gear ratio, the plunger 8*d* of the throttle valve 8 is moved into the rightward limit position thereof as previously described so that a kickdown pressure (line pressure) is developed in the circuit 24. This kickdown pressure is transferred on one hand to the port 3*u* of the 1-2 shift valve 3 and on the other hand to the chamber 4*p* of the 2-3 shift valve 4 through the oil passage 37. The kickdown pressure is transferred to the chamber 4*p* of the 2-3 shift valve through the oil passage 37. The kickdown pressure transferred to the chamber 4*p* acts on the upper and lower pressure-acting areas of the land 4*g* of the spool 4*b* and the upper pressure-acting area of the land 4*h* of the valve spool 4*b* when the valve spool 4*b* is in the position indicated by the left half in the drawing and, in cooperation with the spring 4*d*, causes the valve spools 4*b* and 4*c* to move downwardly into the position indicated by the right half in the drawing. As a consequence, the 2-3 shift valve 4 effects a downshift from the third gear ratio to the second gear ratio in the automatic transmission. When the vehicle speed is further decreased, the kickdown pressure transferred to the port 3*u* of the 1-2 shift valve 3 from the circuit 24 acts on the upper pressure receiving area of the land 3*h*, the upper and lower pressure receiving areas of the land 3*g* and the lower pressure receiving area of the land 3*f* and, in cooperation with the spring 3*d*, causes the valve spools 3*b* and 3*c* to move downwardly against the governor pressure in the chamber 3*e* from the position indicated by the left half as viewed in FIG. 5B to the position indicated by the right half as viewed in FIG. 5B. As a consequence, the 1-2 shift valve 3 effects a downshift from the second gear ratio to the first gear ratio in a manner similar to that which has been described.

When the accelerator pedal is fully depressed to produce a kickdown condition while the vehicle is running with the first gear ratio, the line pressure transferred to the circuit 25 acts on the difference between the pressure-acting areas of the lands 3*m* and 3*n* of the spool 3*c* of the 1-2 shift valve 3 held in the position indicated by the right half as viewed in FIG. 5B, and also on the difference between the pressure-acting areas of the land 4*h* and 4*i* of the spool 4*b* of the 2-3 shift valve 4 held in the position indicated by the right half as viewed in FIG. 5B thereby to urge these spools downwardly. Furthermore, the kickdown pressure in the circuit 24 acts on the difference between the pressure-acting areas of the lands 3*g* and 3*h* of the valve spool 3*b* disposed in the position indicated by the right half as viewed in FIG. 5B and also on the land 4*g* of the valve spool 4*b* of the 2-3 shift valve 4 disposed in the position indicated by the right half as viewed in FIG. 5B thereby to urge each of the valve spools downwardly. Furthermore, the shift valves 3 and 4 are subjected to the downward forces which are exerted by the springs 3*d* and 4*d*, respectively. The above described downward forces exerted on the shift valves 3 and 4 are opposed by the forces resulting from the governor pressure in the chambers 3*e* and 4*e* so that, when the vehicle speed increases to such a value that the governor pressure resulting therefrom ovecomes the downward forces exerted on the valve spool of the 1-2 shift valve 3, then the 1-2 shift valve 3 effects an upshift from the first gear ratio to the second gear ratio, and, when the vehicle speed increases further to such another value that the governor pressure resulting therefrom overcomes the downward forces exerted on the valve spool of the 2-3 shift valve 4, then the 2-3 shift valve 4 effects an upshift from the second gear ratio to the third gear ratio. Since, under this kickdown condition, the downward forces exerted on both of the shift valves 3 and 4 are larger than those under ordinary throttle opening degree conditions as is apparent from the previous description, an upshift will not take place until the vehicle speed further increases as compared to the shift under ordinary throttle opening degree condition, thus permitting the vehicle to be accelerated with a larger power with a relatively lower gear ratio.

Under this kickdown condition, the kickdown pressure appearing in the circuit 24 is delivered through the oil passages 76 and 72 to the chambers 15*d* and 15*d*' of the pressure reducing valves 15 and 15', thus holding the valve spool 15*b* and 15*b*' in the upward positions indicated by the left halves, respectively, as viewed in FIG. 5A, irrespective of the servo apply pressure in the chamber 15*e* and the front clutch pressure in the chamber 15'*e*. Thus, the pressure reducing valves 15 and 15' do not perform their previously described pressure reducing functions, but permit the unreduced line pressure into the servo apply chamber 106'*a* and the front clutch 104. Accordingly, the torque capacity of the second brake 106 applied by the band servo 106 and that of the front clutch 104 are increased as shown by the curve x' in FIG. 6 to provide a characteristic which is large enough as compared to each of the required torque y', thus alleviating shift shocks during the 1-2 upshift and the 2-3 upshift even under this kickdown condition without causing an excessive slip of the second brake 106 and the front clutch 104.

The operation to be achieved if the II range is selected when the vehicle is running with the third gear ratio when the manual valve 2 is in the D range is described. Under the vehicle running condition with the third gear ratio in the D range being selected, the line pressure transferred to the oil passage 40 is transferred through the groove 6*e* and the oil passage 6*g* to the chamber 6*f* of the line pressure booster valve 6, thus moving the spool 6*b* against the spring 6*c* from the position indicated by the upper half as viewed in FIG. 5C to the position indicated by the lower half as viewed in FIG. 5C, and the valve spool 6*b* is held in this position once moved to this position by the line pressure transferred to the chamber 6*f* from the oil passage 31 through the groove 6*e* and the oil passage 6*g*. When, now, the manual valve 2 is moved to the II range, the line pressure circuit 16 is allowed to communicate with the ports 2*b* and 2*c*, the line pressure being transferred through the port 2*b* to the same portions as previously described, the line pressure being transferred from the port 2*c* through the oil passage 35, the shuttle valve 34 and the oil passage 33 to the chamber 4*o* of the 2-3 shift valve 4, thus acting on the land 4*m* to move the spool 4*c* downwardly from the position indicated by the left half as viewed in FIG. 5B to the position indicated by the right half as viewed in FIG. 5B, the line pressure from the port 2*c* being transferred also to the oil passage 45. The 2-3 shift valve 4 is therefore rendered into the same condition as that provided under the previously described kickdown condition with the result that the pressure having been transferred to the front clutch 104 and the servo release chamber 106b' are discharged to effect a downshift from the third gear ratio to the second gear ratio in the automatic transmission, and since with the line pressure transferred to the chamber 4o the spool 4c is held in the above mentioned lower position, an upshift to the third gear ratio will not take place even if the vehicle speed increases. Since the line pressure booster valve 6 is in the above mentioned position, the line pressure transferred to the oil passage 45 is transferred through the oil passage 43 and the shuttle valve 46 to the port 7h of the pressure modifier valve 7. Thus, the pressure modifier valve 7 feeds to the oil passage 54 the pressure modifier pressure of the peak value of the modulated pressure which would be produced at the full throttle opening degree irrespective of the variation in the throttle opening degree, and this pressure modifier pressure being transferred to the regulator valve 1. As a consequence, the regulator valve 1 is enabled, by reason of the previously described function, to feed in the line pressure circuit 16 the line pressure having its peak value irrespective of the variation in the throttle opening degrees. A sufficiently high line pressure is produced and accordingly the rear clutch 105 and the band servo 106' are actuated with strong gripping powers over low to medium throttle opening degrees, thereby assuring a sufficint engine braking effect under the II range condition.

When the vehicle speed decreases to a certain value while the vehicle is running under the II range condition, the valve spool 3b of the 1-2 shift valve 3 is moved downwardly from the position indicated by the left half in the drawing to the position indicated by the right half as viewed in FIG. 5B by the action of the spring 3d with the result that a downshift is effected from the second gear ratio to the first gear ratio in the automatic transmission. Under this condition, the oil pressure in the oil passage 31 is eliminated, and, as a consequence, the spool 6b of the line pressure booster valve 6 is moved back by the spring 6c to the position indicated by the upper half as viewed in FIG. 5C because of the elimination of the force urging the valve spool 6b rightwardly to the position indicated by the lower half as viewed in FIG. 5C. This causes the line pressure in the oil passage 45 to be brought to an end at the line pressure booster valve 6 and the oil passage 43 to communicate through the oil passages 44 and 47 to the drain port 9c of the throttle failsafe valve 9. Transferred to the port 7h of the pressure modifier valve 7 is the throttle pressure from the circuit 48 as a result of the switching of the shuttle valve 46, thereby rendering the regulator valve 1 to perform the function to feed the previously descibed unboosted line pressure to the circuit 16 because the pressure modifier valve 7 transfers the previously described pressure modifier pressure through the oil passage 54 to the regulator valve 1.

As the vehicle speed increases thereafter and as a consequence the governor pressure in the chamber 3e of the 1-2 shift valve 3 renders the shift valve to the upshift condition, an upshift is made from the first gear ratio to the second gear ratio in the automatic transmission. However, the spool 6b of the line pressure booster valve 6 is not moved to the right from the upper position as viewed in FIG. 5C even if the line pressure in the oil passage 31 is transferred to this valve. Therefore, the line pressure booster valve 6 causes the regulator valve to produce the line pressure of a sufficiently high value to assure a capacity of the second brake to grip the clutch drum over the whole throttle opening degrees as preveiously described to assure an effective engine braking in the II range only when the II range is selected under the vehicle running condition with the third gear ratio or when a downshift is effected into the second gear ratio after I range has been selected under the vehicle running condition with the third gear ratio, whereas, once the first gear ratio has been established, the subsequent upshift from the first gear ratio to the second gear ratio and thereafter the downshift back to the first gear ratio from the second gear ratio do not cause the boosting up of the line pressure, thus preventing the occurrence of an excessive shift shock. Because the second brake 106 is maintained gripped during a shifting from the second gear ratio in the D range to the II range, it is not required to increase the capacity during this shifting as high as the capaicty required upon making a shift from the third gear ratio to the II range or to the I range, thus making it unnecessary to boost the line pressure.

When, now, the manual valve 2 is moved to I range, the line pressure circuit 16 is transferred to the port 2d in addition to the ports 2b and 2c. From the ports 2b and 2c, the line pressure is transferred to the same portions as previously described, while, the line pressure from the port 2d is transferred to the manual first range pressure reducing valve 11. There being no pressure in the chamber 11d of the pressure reducing valve 11 initially, the spool 11b is held downwardly in the position indicated by the right half as viewed in FIG. 5C by means of the spring 11c, but, since the line pressure in the oil passage 59 is transferred through the oil passage 58 to the chamber 11d to urge the spool 11b upwardly to drain off a portion of the line pressure through the drain port 11f until the forces exerted to the valve spool 11b are balanced, the valve spool 11b thus takes the balanced position indicated by the left half as viewed in FIG. 5C, so that the pressure is reduced to a level equal to the spring force provided when the valve spool is in this balanced position. Thus, the line pressure transferred to the oil passage 59 is reduced to a constant value and the pressure having this constant value is transferred through the oil passage 58, the shuttle valve 28 and the oil passage 26 to act on the land 3l of the 1-2 shift valve 3, thus providing a force to urge the spool 3c downwardly. At the vehicle speeds wherein the downward force is smaller than the upward force resulting from the governor pressure in the chamber 3e of the 1-2 shift valve 3, the valve spools 3b and 3c are held in the position indicated by the left half as viewed in FIG. 5B to maintain the automatic transmission in the second gear ratio, thereby preventing the engine from overrunning which otherwise would occur when, for example, the I range is selected while the vehicle is running at high vehicle speeds. In this case, the line pressure is boosted by the line pressure booster valve 6 only when the I range is selected in the third gear ratio as preveiously explained in connection with the II range. As the vehicle speed decreases to decrease the upward force resulting from the governor pressure in the chamber 3e, the spool 3c is pushed downwardly to the position indicated by the right half as viewed in FIG. 5B by the downward force resulting from the previously mentioned reduced constant pressure acting upon the land 3l, while, the spool 3b is separated from the valve spool 3c and held, while compressing the spring 3d, in the position indicated by the left half as viewed in FIG. 5B by the upward force caused by the previously mentioned reduced constant pressure acting on the lower end face of the valve spool 3b. Under this condition, the oil passage 27 having been communicating with the drain port 3s is allowed to communicate with the oil passage 26, the reduced constant pressure in the oil passage 26 is transferred through the oil passage 27 to the low-and-reverse brake 107, with the result that the automatic transmission can drive the vehicle under I range condition while producing an engine braking effect by means of the actuation of the low-and-reverse brake 107 in cooperation with the engagement of the rear clutch 105. With the manual first range pressure reducing valve 11, the line pressure in the oil passage 49 is reduced to a constant value which is determined by the force of the spring 11c, a shift point by the 1-2 shift valve 3 is set to take place at a predetermined constant vehicle speed, and the engine is prevented from overruning with any delay over the while throttle opening degrees.

When the manual valve 2 is moved from the N range to the R range, the line pressure circuit 16 is allowed to communicate with the port 2a only. From the port 2a, the line pressure is transferred through the oil passage 60 to the shuttle valve 28 on one hand, and through the shuttle valve 28 and the oil passage 26 to the 1-2 shift valve 3 on the other hand, while, since no governor pressure is available in the chamber 3e under this condition because the governor pressure is available only when the vehicle is running forwardly, with the result that the valve spools 3b and 3c are in their right half position as viewed in FIG. 5B to permit the line pressure to be transferred to the low-and-reverse brake 107 through the oil passage 27 and to be transferred through the orifice 78, the shuttle valve 61 and the oil passage 62 to the front clutch 104. The line pressure to be transferred to the front clutch 104 is restricted by the orifice 78 on the way to the front clutch 104 so that the oil pressure to be developed in the front clutch is initially low and thereafter increases at a gradually increasing rate. This front clutch supply pressure is transferred through the branch of the oil passage 60 to the chamber 12a of the accumulator 12, thereby pushing down the stepped piston 12b against the spring 12f. This causes the front clutch supply pressure to increase slowly so that the front clutch 104 is slowly engaged without causing any shock when the manual valve 2 is moved from the N range to the R range. Thus, the automatic transmission is operative to drive the vehicle rearwardly with the front clutch 104 engaged and the low-and-reverse brake 107 applied.

When the manual valve 2 is moved back into the N range, the port 2a is allowed to communicate with the drainage, thus discharging the line pressure in the front clutch 104 through the oil passage 62, the shuttle valve 61, the oil passage 60, the check valve 79 and the port 2a of the manual valve 2, and discharging the line pressure in the low and reverse brake 107 through the oil passages 27 and 26, the shuttle valve 28, the oil passage 60 and the port 2a of the manual valve 2 quickly, with the result the automatic transmission is held neutral.

It will now be understood that, because the gear shift shock upon making a shift from the first gear ratio to the second gear ratio or upon making a shift from the second gear ratio to the third gear ratio is reduced by the pressure reducing valves 15 and 15' in the place of an inevitably bulky accumulator used in the conventional apparatus, the shift shock reducing apparatus can be made compact owing to the fact that the pressure reducing valves 15 and 15' are compact in construction, and the apparatus can be simplified and made at a low cost because the one-way valve i (see FIG. 1) used in the conventional apparatus has been eliminated. Additionally, the pressure reducing valves 15 and 15' are constructed and arranged to cease their pressure reducing functions under a kickdown condition to provide an unreduced line pressure to the second brake under kickdown condition when a large torque capacity is required, thus securely preventing the occurrence of slippage during shifting from the first gear ratio to the second gear ratio or during the second gear ratio to the third gear ratio.

Figure 7:
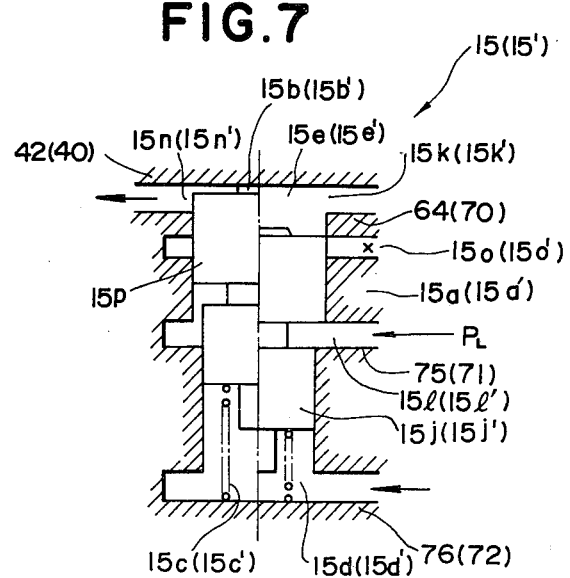
FIG. 7 is a sectional view of a modification of the pressure reducing valves used in the apparatus according to the present invention.

The pressure reducing valves 15 and 15' may take the form illustrated in FIG. 7, instead of the previously described construction, and in this case it is possible to further miniturize and simplify the construction of each pressure reducing valve. This embodiment is substantially similar to the previously described FIG. 4 embodiment except that a single land 15p is provided instead of the two lands 15h and 15i(15'h and 15'i) on the spool 15b(15'b), and the ports 15k(15'k) and 15n(15'n) are formed in the housing to open to a chamber 15e(15'e). With this construction, while the 1-2 gear shift oil pressure from the oil passage 42(40) is transferred through the port 15k(15'k) and the oil passage 64(70) to the servo release chamber 106'a (front clutch 104), this pressure acts within the chamber 15e(15e') to urge the valve spool 15b(15b') to move from the position indicated by the left half in the drawing to the position indicated by the right half in the drawing, thus opening the drain port 15o(15o'). Thus, in this embodiment, the pressure reducing function is the same as the previously described embodiment and is effected under the same conditions except the kickdown condition, and under the kickdown condition these valves are rendered inoperative to cease their pressure reducing functions, thus eliminating one-way valve.

What is claimed is:

1. A gear shift shock reducing apparatus of a hydraulic control system for an automatic transmission including a driving member operatively connected to the output shaft of an engine of an automotive vehicle, a driven member, and frictional units having fluid operated actuating means selectively made operative and inoperative for producing a plurality of gear ratios between the driving and driven members, comprising:

means for generating a line fluid pressure;
   means for generating a kickdown fluid pressure under a kickdown condition;
   a manual valve provided operatively between said line fluid pressure generating means and the respective fluid operated actuating means of the frictional units;
   a shift valve provided operatively between said manual valve and at least one of the fluid operated actuating means of the frictional units, said shift valve having a valve spool movable into a position providing communication between said line fluid pressure generating means through said manual valve and said at least one of the fluid operated actuating means; and
   a pressure reducing valve provided operatively between said at least one of the fluid operated actuating means and said manual valve and having a valve member movable into a position providing communication between said at least one of the fluid operated actuating means and said manual valve through said shift valve, said pressure reducing valve communicating with said kickdown fluid pressure generating means for producing an actuating fluid pressure which is not higher than said line fluid pressure in response to the absence of said kickdown fluid pressure, said valve member of said fluid pressure reducing valve including a first pressure-acting area which is selectively exposed to said actuating said pressure to which said at least one of the fluid operated actuating means is selectively exposed and a second pressure-acting area, opposite to said first pressure-acting area, which is selectively exposed to said kickdown fluid pressure, said valve member of said pressure reducing valve being held in said position providing communication between said at least one of the fluid operated actuating means and said manual valve through said shift valve when said second pressure-acting area is exposed to said kickdown fluid pressure.

2. A gear shift shock reducing apparatus as claimed in claim 1, wherein said pressure reducing valve communicates with said line fluid pressure generating means and responsive to said line fluid pressure upon producing said actuating fluid pressure, said valve member of said pressure reducing valve including a third pressure-acting area, opposite to said first pressure-acting area, which is exposed to said line fluid pressure.

3. A gear shift shock reducing apparatus as claimed in claim 2, wherein said pressure reducing valve includes a spring biasing said valve member of said pressure reducing valve toward said position providing communication between said at least one of the fluid operated actuating means and said manual valve through said shift valve.

4. A gear shift shock reducing apparatus as claimed in claim 3, wherein said pressure reducing valve has a drain port and said valve member has two axially spaced first and second lands which have the same diameter and a third land which is axially spaced from said second land and is smaller in diameter than said second land, said first land having said first pressure-acting area, said second land and third land defining therebetween said third pressure-acting area, said third land having said second pressure-acting area, said first land selectively opening or closing said drain port.

5. A gear shift shock reducing apparatus as claimed in claim 3, wherein said pressure reducing valve has a drain port, and wherein said valve member of said pressure reducing valve has two axially spaced first and second lands, said second land being smaller in diameter than said first land, said first land having said first pressure-acting area, said second land having said second pressure acting area, said first and second lands defining therebetween said third pressure acting area, said first land selectively opening or closing said drain port.

6. A shock reducing apparatus of a hydraulic control system for an automatic transmission including a driving member operatively connected to the output shaft of an engine of an automotive vehicle, a driven member, and frictional units having fluid operated actuating means selectively made operative and inoperative for producing a plurality of gear ratios between the driving and driven members, comprising:

a throttle pressure valve means for generating a throttle fluid pressure;

a pressure regulator valve means for generating a line fluid pressure variable with said throttle fluid pressure;

means for generating a kickdown fluid pressure under a kickdown condition;

a manual valve provided operatively between the fluid pressure regulator valve means and the respective fluid operated actuating means of the frictional units;

a shift valve provided operatively between said manual valve and one of the fluid operated actuating means of the frictional units, said shift valve having a valve spool movable into a position providing communication between said pressure regulator valve means and said at least one of the fluid operated actuating means; and a pressure reducing valve provided operatively between said at least one of the fluid operated actuating means and said manual valve and having a valve member movable into a position providing communication between said at least one of the fluid operated actuating means and said manual valve through said shift valve, said fluid pressure reducing valve communicating with said kickdown fluid pressure generating means for producing an actuating fluid pressure variable with said throttle fluid pressure in response to the absence of said kickdown fluid pressure, said valve member of said fluid pressure reducing valve including a first pressure-acting area which is selectively exposed to said actuating fluid pressure to which said at least one of the fluid operated actuating means is selectively exposed and a second pressure-acting area, opposite to said first pressure-acting area, which is selectively exposed to said kickdown fluid pressure, said valve member of said pressure reducing valve being held in said position providing communication between said at least one of the fluid operated actuating means and said manual valve through said shift valve when said second pressure-acting area is exposed to said kickdown fluid pressure.

7. A gear shift shock reducing apparatus as claimed in claim 6, including a pressure modifier valve provided operatively between said throttle pressure valve means and said pressure regulator valve means, said pressure modifier valve being selectively communicable with said throttle pressure valve means and responsive to said throttle fluid pressure for producing a modified fluid pressure which is variable with said throttle fluid pressure, and wherein said pressure regulator valve means communicates with said pressure modifier valve and responsive to said modified fluid pressure upon generating said line fluid pressure, and wherein said pressure reducing valve communicates with said pressure regulator valve means and is responsive to said line fluid pressure upon producing said actuating fluid pressure, said valve member of said pressure reducing valve including a third pressure-acting area, opposite to said first pressure-acting area, which is exposed to said line fluid pressure.

8. A shock reducing apparatus of a hydraulic control system for an automatic transmission including a driving member operatively connected to the output shaft of an engine of an automotive vehicle, a driven member, and frictional units including a first frictional unit and a second frictional unit, having fluid operated actuating means selectively made operative and inoperative for producing a plurality of gear ratios between the driving and driven members, comprising:

means for generating a throttle fluid pressure;

means selectively communicable with said throttle fluid pressure generating means for producing a modified fluid pressure variable with said throttle fluid pressure;

means communicating with said modified fluid pressure generating means for generating a line fluid pressure variable with said modified fluid pressure;

means for generating a kickdown fluid pressure under a kickdown condition;

a manual valve provided operatively between the fluid pressure regulator valve and the respective fluid operated actuating means of the frictional units;

shift valves, each provided operatively between said manual valve and each of the fluid operated actuating means of the first and second frictional units, each shift valve having a valve spool movable into a position providing communication between said line fluid pressure generating means and the corresponding fluid operated actuating means; and pressure reducing valves, each provided operatively between each of the fluid operated actuating means of the first and second frictional units and said manual valve and having a valve member movable into a position providing communication between the corresponding fluid operated actuating means and said manual valve through said corresponding shift valve, said fluid pressure reducing valve communicating with said line fluid pressure generating means and said kickdown fluid pressure generating means and responsive to said kickdown fluid pressure for producing an actuating fluid pressure variable with said line fluid pressure in response to the absence of said kickdown fluid pressure, said valve member of each of said fluid pressure reducing valves including a first pressure-acting area which is selectively exposed to said actuating fluid pressure to which said corresponding fluid operated actuating means is selectively exposed, a second pressure-acting area, opposite to said first pressure-acting area, which is selectively exposed to said kickdown fluid pressure, and a third pressure-acting area, opposite to said first pressure-acting area, which is exposed to said line fluid pressure, said valve member of each of said pressure reducing valves being held in said position providing communication between said corresponding fluid operated actuating means and said manual valve through said corresponding shift valve when said second pressure-acting area is exposed to said kickdown fluid pressure.

* * * * *

UNITED STATES PATENT AND TRADEMARK OFFICE
CERTIFICATE OF CORRECTION

PATENT NO. : 4,445,401
DATED : May 1, 1984
INVENTOR(S) : Wataru Ishimaru

It is certified that error appears in the above-identified patent and that said Letters Patent are hereby corrected as shown below:

After "[76] Inventor: Wataru Ishimaru, No. 3-5-19, Ikego, Zushi City, Japan", insert --¶[73] Assignee: Nissan Motor Co., Ltd., Yokohama City, Japan"--

Signed and Sealed this

Nineteenth Day of March 1985

[SEAL]

Attest:

DONALD J. QUIGG

Attesting Officer — Acting Commissioner of Patents and Trademarks